US007746294B2

(12) United States Patent
Lee et al.

(10) Patent No.: US 7,746,294 B2
(45) Date of Patent: Jun. 29, 2010

(54) TRANSFLECTIVE LIQUID CRYSTAL DISPLAY

(75) Inventors: Ju-Hyun Lee, Oviedo, FL (US); Xinyu Zhu, Orlando, FL (US); Shin-Tson Wu, Oviedo, FL (US)

(73) Assignees: University of Central Florida Research Foundation, Inc., Orlando, FL (US); Toppoly Optoelectronics Corp., Miao-Li County (TW)

( * ) Notice: Subject to any disclaimer, the term of this patent is extended or adjusted under 35 U.S.C. 154(b) by 1104 days.

(21) Appl. No.: 11/404,539

(22) Filed: Apr. 14, 2006

(65) Prior Publication Data

US 2007/0242014 A1    Oct. 18, 2007

(51) Int. Cl.
*G09G 3/00* (2006.01)

(52) U.S. Cl. ............................ 345/30; 345/87; 345/102; 349/114

(58) Field of Classification Search ........... 345/87–102, 345/30; 349/110–114, 12, 98, 178; 350/288, 350/338
See application file for complete search history.

(56) References Cited

U.S. PATENT DOCUMENTS

| | | | |
|---|---|---|---|
| 4,040,727 A | 8/1977 | Ketchpel | 350/288 |
| 4,090,219 A | 5/1978 | Ernstoff et al. | 358/59 |
| 4,093,356 A | 6/1978 | Bigelow | 350/338 |
| 4,870,396 A | 9/1989 | Shields | 340/719 |
| 6,281,952 B1 | 8/2001 | Okamoto et al. | 349/12 |
| 7,499,116 B2 * | 3/2009 | Tsai et al. | 349/38 |
| 7,499,128 B2 * | 3/2009 | Hu et al. | 349/108 |
| 7,564,530 B2 * | 7/2009 | Hu et al. | 349/143 |
| 2003/0151580 A1 * | 8/2003 | Ma | 345/96 |
| 2006/0012552 A1 * | 1/2006 | Chiu et al. | 345/87 |
| 2006/0087486 A1 * | 4/2006 | Lee | 345/102 |
| 2007/0076145 A1 * | 4/2007 | Morimoto et al. | 349/114 |
| 2008/0055519 A1 * | 3/2008 | Battersby et al. | 349/68 |
| 2008/0252588 A1 * | 10/2008 | Huang | 345/100 |

OTHER PUBLICATIONS

Fujimori, Kohichi, et al., 53.3: "New Color Filter Structures for Transflective TFT-LCD", Sharp Corporation., Display Technology Development Group, 2002, SID Digest International Symposium, p. 1382-1385.
Lee, Baek-woon, et al., "40.5L: Late-News Paper: TFT-LCD with RGBW Color System", Samsung Electronics Corp., in Proceeding of International Display Manufacturing Conference 2003, SID Digest, p. 212-215.

* cited by examiner

*Primary Examiner*—Kimnhung Nguyen
(74) *Attorney, Agent, or Firm*—Brian S. Steinberger; Phyllis K. Wood; Law Offices of Brian S. Steinberger, P.A.

(57) ABSTRACT

The apparatus, methods, system and devices of the present invention provides transflective LCD system structure wherein each pixel is composed of at least three reflective sub-pixels and at least one transmissive sub-pixel. The reflective sub-pixels have a color filter layer for displaying color reflective images and the transmissive sub-pixel it is driven by color sequential imaging method for displaying a color transmissive image. The configuration of the sub-pixels and the location of the sub-pixel electronics increases the aperture ratio of both transmissive sub-pixel and reflective sub-pixel to improve the image brightness and lower the overall power consumption of the device.

32 Claims, 21 Drawing Sheets

TRANSFLECTIVE LIQUID CRYSTAL DISPLAY

FIELD OF THE INVENTION

This invention relates to transflective liquid crystal displays and, in particular, to apparatus, methods, system and devices for a transflective liquid crystal display having a pixel structure including at least three reflective sub-pixels and one transmissive sub-pixel which improves the aperture sizes of both reflective and transmissive sub-pixels to provide brighter image for both reflective and transmissive modes.

BACKGROUND AND PRIOR ART

Since liquid crystal display (LCD) was discovered, two types of the LCD have been developed and widely used in information display tools, including cell phones, laptops and desktop computers, televisions, and so on. One type is the transmissive LCD which employs a light source called ""backlight"" at the back side of the liquid crystal cell. The other type is the reflective LCD which uses ambient light as a light source instead of backlight to display an image. Because of using ambient light, the reflective LCD consumes less power than the transmissive LCD so that it is more suitable for portable electronic devices which require low power consumption. However, under the dark ambient, the reflective LCD cannot show the image well. The transmissive LCD, on the other hand, shows the high quality image under the dark ambient because it has its own built-in light source.

To take the advantages and overcome the disadvantages of both transmissive LCD and reflective LCD, the transflective LCD is proposed. Transflective LCD means it can display an image in transmissive display mode and reflective display mode independently or simultaneously. Therefore, such a transflective LCD is designed to be used under any ambient circumstances.

To realize the transflective LCD, some amount of incident light from ambient should be reflected back to the reviewer, and at the same time, some amount of backlight should transmit the LCD device and reach the reviewer's eye independently or simultaneously. The component controlling the reflection and transmission of light is called a transflector hereafter. There are several approaches to realize the function of transflector.

One of the well-known technologies uses a partially transmitting mirror made of very thin metal film. U.S. Pat. No. 4,093,356 issued to Bigelow on Jun. 6, 1978 disclosed a transflective LCD design using partially transmitting mirror. It provides the easiness of designing the device structure. However, to control the uniformity of the metallic film thickness over a large area is not easy. This is especially true for the glass substrate used in the large screen-size LCD manufacturing. Instead of the partially transmitting mirror, the semi-transparent reflector which has both fully transmitting part and fully reflecting part has become popular in these days.

U.S. Pat. No. 4,040,727 issued to Ketchpel on Aug. 9, 1977 discloses a transflector based on discontinuous reflective film. An advantage of this kind of transflector is that it can easily control the area ratio of the transmissive part and the reflective part so that it provides the easiness of optimizing the device performance for indoor-oriented or outdoor-oriented applications. FIG. 1 shows a pixel structure 100 of the today's popular conventional transflective LCD which uses discontinuous reflective mirror. It consists of three primary color sub-pixels: Red 101, Green 102, and Blue 103. Each color sub-pixel has a color filter layer and a reflective mirror. Moreover, each sub-pixel further comprises a transmission region, which is denoted as 111, 112, and 113 for each sub-pixel, respectively. Light from the backlight source can transmit through this transmission region and it is responsible for displaying an image in the transmissive mode.

The transflective LCD based on discontinuous reflective film also has some problems, including different electro-optic properties and unequal color reproduction between transmissive and reflective modes. To solve the different color reproduction problem, Fujimori et al. proposed a method using different thickness of color filters for transmissive and reflective parts as disclosed in Digest of Technical Papers of Society for Information Display 2002 International Symposium, p. 1382. This method is effective to make the equal color reproduction for transmissive and reflective images. However, it increases the complexity of the device fabrication process. As for the different electro-optic properties of the transflective LCDs, there are several approaches to overcome this problem.

U.S. Pat. No. 6,281,952 issued to Okamoto et al on Aug. 28, 2001, discloses a transflective LCD which has different thicknesses of the liquid crystal layer on transmissive and reflective parts. In the reflective part, light passes through the liquid crystal layer twice while light in the transmissive part passes through the liquid crystal layer only once. By adjusting the thicknesses of the liquid crystal layer on transmissive and reflective parts, the same optical phase retardation can be obtained in transmissive and reflective parts for both ambient light and backlight. As a result, the equal electro-optic response for transmissive and reflective images can be obtained. However, to fabricate different cell gaps for transmissive and reflective parts, which is also called double cell-gap approach, is not easy.

The '952 patent also discloses using different liquid crystal alignment structures for transmissive and reflective modes. In this configuration, the cell gaps for both transmissive and reflective parts can be identical to each other. Even though this approach reduces the fabrication difficulty of the double cell gap structure; however, the device fabrication process is still not easy due to the complicated alignment process. Another approach without increasing the fabrication difficulty is using double switch devices, such as thin film transistors (TFTs), to control the reflective and the transmissive parts individually and independently, as disclosed by Liu et al. in Proceeding of International Display Manufacturing Conference 2003, p. 215. This technique is called a double TFTs driving method. However, this approach increases the manufacturing cost because it requires twice as many data driver ICs.

For direct view type LCDs, including the transflective LCD, one important technical issue is how to improve the light efficiency so as to enhance the brightness of the image. One of the approaches is to use four sub-pixels, including a white sub pixel, which was proposed by Lee et al in Digest of Technical Papers of Society for Information Display 2003 International Symposium, p. 1212. Such a device design can lower the power consumption by about 50% to achieve the same brightness level as the traditional LCDs. Another approach is to use the color sequential technology to display the color image. U.S. Pat. No. 4,090,219 issued to Ernstoff et al. on May 16, 1978 describes color sequential LCD technology. The basic concept of the color sequential technology is that it displays the color image by sequentially drawn primary color images instead of by the images of primary color sub-pixels. Therefore, the color sequential technology based transmissive LCD can use a color switching backlight and a single pixel without a color filter layer to display a full color"

image. It avoids the light absorption by the color filter and in the same time increases the pixel aperture size three times for each primary color compared to the conventional transmissive LCD. As a result, the color sequential LCD increases the brightness of images and enhance the power utilization efficiency. Another advantage of color sequential LCDs is improved color reproduction capacity when the light-emitting diode (LED) backlight is used.

However, to realize the color sequential imaging, timing control of the LCD and the driving of backlight is very important. To understand the driving scheme of the color sequential LCD, we need to understand the basic principle of imaging method of the LCD called a line-at-a-time scanning method.

As shown in FIGS. 2a and 2b, a sub-pixel in the conventional LCD consists of a pixel electronic circuit 210 and a pair of electrode and liquid crystal layer 220. The pixel electronic circuit consists of a TFT 211 and a capacitor 212. One terminal of the TFT, called source or data line 201, is connected to the data driver 240 of the system to get image data. One terminal of the TFT, called gate 202, is connected to the gate driver or scan driver 250. The gate signal switches the TFT between the ON and OFF states. When the TFT is ON, the data signal from the data driver transfers to the drain terminal of the TFT which is connected to the capacitor 212. The transferred data signal charges the capacitor 212 and the voltage of the capacitor drives the liquid crystal layer 220.

As shown in FIG. 2b, pixels in the same column are connected to the same data line and all pixels in the same row are connected to the same gate line. The horizontal and vertical sync signals 230 synchronize the signal process between the data driver 240 and gate driver 250. The scan driver 250 selects one gate line each time from the first row to the last row. After the last row is selected, it restarts from the first row again. When one row is selected, the synchronized video signals from the data driver 240 charge the capacitors of all of the pixels on the selected row. As a result, an image is drawn from top to bottom, row by row. Using the capacitor 212, image data are stored during one period of scanning, which is called one frame time. During one frame time, the image is held until it is refreshed in the next frame time. The prior art imaging method described is referred to as a line-at-a-time scanning method.

The line-at-a-time scanning is shown in the timing diagram in FIG. 3. The y-axis represents the row number of the pixels in the LCD while x-axis represents time. Thick slanted lines represent four successive timing lines 311, 312, 313, and 314 for gate line scanning. The time interval between the timing lines of the gate line scanning signal for the same row is the frame period. During the $m^{th}$ frame period, the image data 320 are held. FIG. 3 shows the image data 320 for the first, $i^{th}$, and $N^{th}$ rows, respectively. In the $m+1^{th}$ frame period, image data 320 is refreshed by a next image data.

By applying the line-at-a-time driving method to the color sequential LCD, the backlight device exposes red, green, and blue color light with line by line scanning. Each color light remains on during one sub-frame period or slightly shorter. In the next sub-frame period, another different color backlight is turned on and hold for one sub-frame period. Consequently, after three successive sub-frame periods, the red, green, and blue backlight are each turned on once, with one sub-frame period, as shown in FIG. 4. FIG. 4 shows the red area 410, green area 402, and blue area 403 showing the light exposing time for the rows of pixels, respectively. Timing lines of row scanning 411, 412, and 413 are for red 401, green 402, and blue 403 sub-frames, respectively. This kind of backlight device can be used in some specific single panel imager based projection displays, such as digital light processing (DLP) and liquid crystal on silicon (LCoS) systems. However, in the direct-view type LCDs it is very difficult to realize the above-mentioned backlight device.

To solve this difficulty, several modified driving schemes were suggested. One of them is using a blinking backlight as shown in FIG. 5. In the figure, red 401, green 402, and blue 403 light are turned on only in a short period, which is much shorter than the sub-frame period. The scanning time of the gate line for a frame image 520 is shorter than one sub-frame period. When the last gate line is selected, the backlight is turned on until the first row is selected again in the next sub-frame period. Therefore, there exists an interval between the first gate line is selected and the last gate line is selected, in which the backlight is turned off. However, the drawback of this method is it requires fast response liquid crystal mode and high intensity backlight source.

Another method is to use the dark sub-frame between two neighboring color sub-frames as shown in FIG. 6. Due to the use of the dark sub-frame, the total number of sub-frames per frame period increases twice compared to the previously described color sequential imaging methods shown in FIG. 4. As shown in FIG. 6, the red 401, green 402, and blue 403 backlights are turned on during two successive sub-frame periods. However, during these two successive sub-frame periods, there is one image sub-frame and one dark sub-frame. Using the red backlight 401 as an example, when the scan driver selects from the first row to the last row, an image sub-frame is inserted following the timing line 613 of row scanning 411. When the scan driver selects the first row again, which is the beginning of the next sub-frame period, a dark sub-frame is inserted following the timing line of the next scanning 611. Using the dark sub-frame, the time intervals of light exposure on all pixels is the same. An advantage of this method is that it is easy to realize the backlight device in direct-view display devices. However, this method also requires faster liquid crystal mode and it suffers half of light energy lose.

U.S. Pat. No. 4,870,396 issued to Shields et al. on Sep. 26, 1989 discloses a liquid crystal display driven by dual switching devices in one sub-pixel. FIG. 7a shows the basic concept of LCD driving based on dual TFTs 710 in one sub-pixel. Each of these two TFTs has its own function: one functions as a memory part to store the image data and the other as an imaging part to control the director orientation of the liquid crystal layer 720 by using the data stored in the memory capacitor 708. In the figure, the data line 703 of the first TFT 701 is connected to the data driver 240, as shown in FIG. 7B. The gate line 704 of the first TFT 701 is connected to the scan driver 250. The drain 706 of the first TFT 701 is connected to the source of the second TFT 702 which is also connected to the first storage capacitor 707.

When the scan driver scans from the first row to the last row, image data are transferred to the first storage capacitor 707 through the first TFT 701. The stored data in the first capacitor 707 do not transferred to the liquid crystal layer 720 immediately because the second TFT 702 is not activated yet during the scanning time. Therefore, the combination of the first capacitor 707 and the first TFT 701 functions as a memory buffer. After scanning all rows, that is, after finishing writing one frame image data into the frame buffer, all second TFTs 702 are activated simultaneously by triggering the gate lines 705. Consequently, the stored image data in the first capacitor 707 are transferred to the second capacitor 708 to control the liquid crystal layer 720. FIG. 7b shows the electrodes connection between sub-pixels and drivers. Because each sub-pixel has two gate input lines G and VS, there are two lines in each sub-pixel which are connected to the scan driver.

The timing chart of the color sequential LCD driving based on the dual TFT method is shown in FIG. 8. During one sequence of the scanning the rows of pixels along the timing lines 411, 412, and 413, the image data of red, green, and blue sub-frame are transferred to the frame buffer memory. After the scanning process, data in the frame buffer are transferred to the second capacitor in the sub-pixels at time points of 801, 802, and 803, as shown in FIG. 8. Color of the backlight is changed synchronously with the time of triggering the second TFTs. During one sub-frame period, the next sub-frame's image data are transferred to the frame buffer memory. The advantage of this method is it doesn't need dark sub-frames. Therefore, it doesn't lose energy of light.

SUMMARY OF THE INVENTION

The first objective of this invention is to provide apparatus, methods, system and devices for a transflective LCD with a pixel structure including at least three reflective sub-pixels and one transmissive sub-pixel.

The second objective of this invention is to provide apparatus, methods, system and devices for improved color reproduction capacity of the transflective LCD for both transmissive and reflective images by using color filters for the reflective sub-pixels to optimize the color filter property for the reflective images.

A third objective of the present invention is to provide apparatus, methods, system and devices for maximizing the color purity of the transmissive image using a backlight which can switch the illumination colors sequentially.

The fourth objective of the present invention is to provide apparatus, methods, system and devices that use the same electro-optic responses in both reflective and transflective modes in the transflective LCD without increasing the complexity of fabrication processes.

A fifth objective of the present invention is to provide apparatus, methods, system and devices for driving the reflective sub-pixels and the transmissive sub-pixel with independent TFTs so that their electro-optic curves overlap by using a double TFT driving concept.

A sixth objective of this invention is to provide apparatus, methods, system and devices for reducing the manufacturing cost of transflective LCD by eliminating complicated fabrication processes such as double cell gap, double domain alignment, and patterned retardation film.

A seventh objective of the present invention is to provide apparatus, methods, system and devices for reducing the manufacturing cost of transflective LCD by eliminating the use of the dual thickness color filter for the optimization of the color purity for both transmissive and reflective mode images to simplify the fabrication process and increase the manufacturing yield.

An eighth objective of the present invention is to provide apparatus, methods, system and devices for producing a brighter image in comparison to the image of prior art transflective LCDs.

In a first embodiment of the present invention, the transflective liquid crystal display includes a top and a bottom substrate having a liquid crystal layer sandwiched therebetween and plural pixels, each including at least three reflective sub-pixels for displaying a reflective image, wherein each one of the at least three reflective sub-pixels having a reflective layer on an inner surface of the bottom substrate to reflect an incident light back to a viewer, and a transmissive sub-pixel for displaying a transmissive image. At least one electronic circuit is used for driving the at least three reflective sub-pixels and the transmissive sub-pixel of each one of the plural pixels and a backlight below the transmissive sub-pixels for producing a transmissive image and a timing control unit connected with the at least one electronic circuit converts and distributes an incoming video data to the plural pixels and controlling the backlight to synchronize the reflective and transmissive display images.

Each one of the plural pixels further includes at least three different color filter layers located on one of the top and the bottom substrate of the at least three reflective sub-pixels, respectively, for displaying a reflective color image and at least three different color light sources below the transmissive sub-pixel are used to sequentially transmit a color transmissive image for each of the at least three different colors. The at least one electronic circuit includes plural first and second scan electrodes, and plural first and second data electrodes, wherein one of the plural first scan electrodes and one of the plural first data electrode connect each one of the at least three reflective sub-pixels to the at least one electronic circuit and one of the plural second scan electrodes and one of the plural second data electrodes connect each one of the transmissive sub-pixel to the at least one electronic circuit.

DESCRIPTION OF THE PREFERRED EMBODIMENTS

Figure 1:
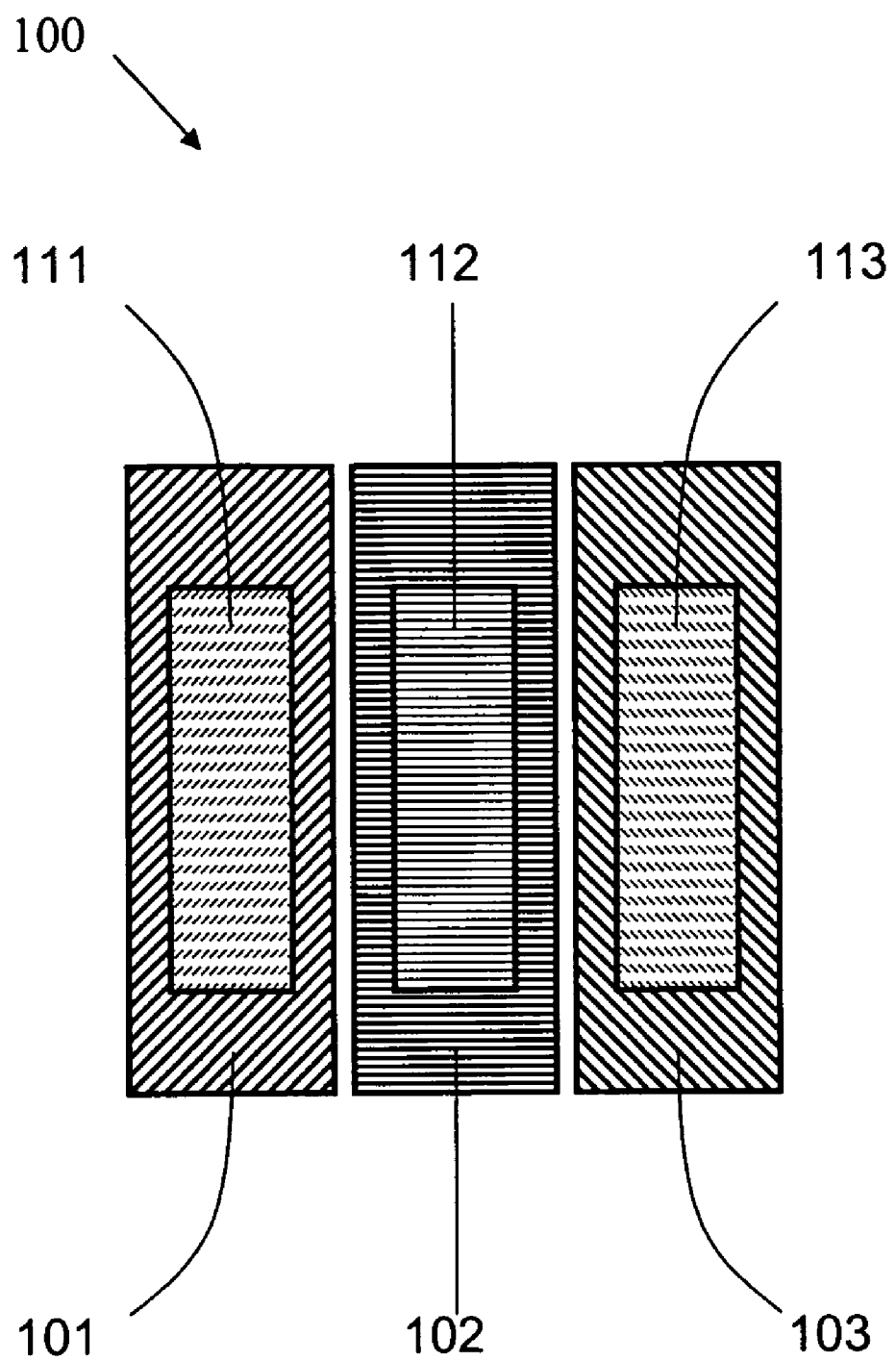
FIG. 1 shows a pixel of a prior art transflective liquid crystal display.
Figure 2A:
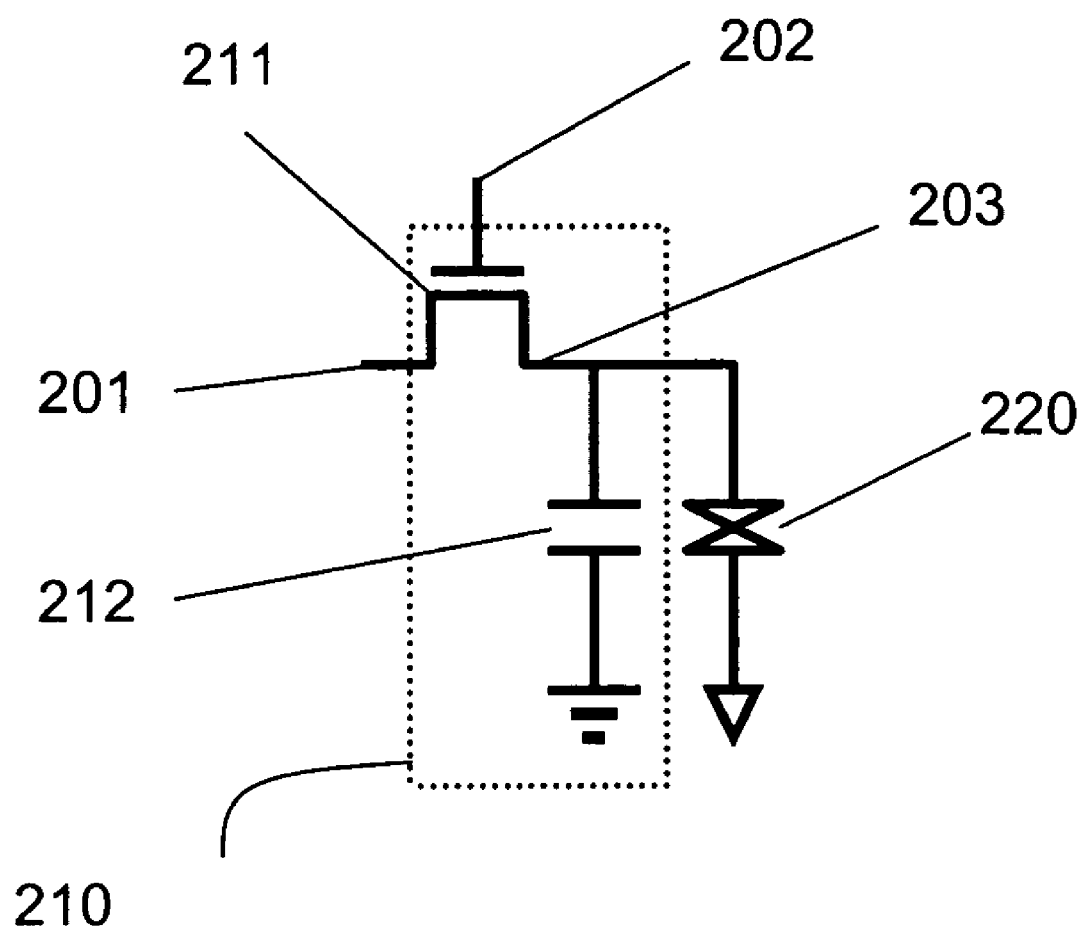
FIG. 2a is a schematic of the pixel electronic circuit having a single switch device.
Figure 2B:
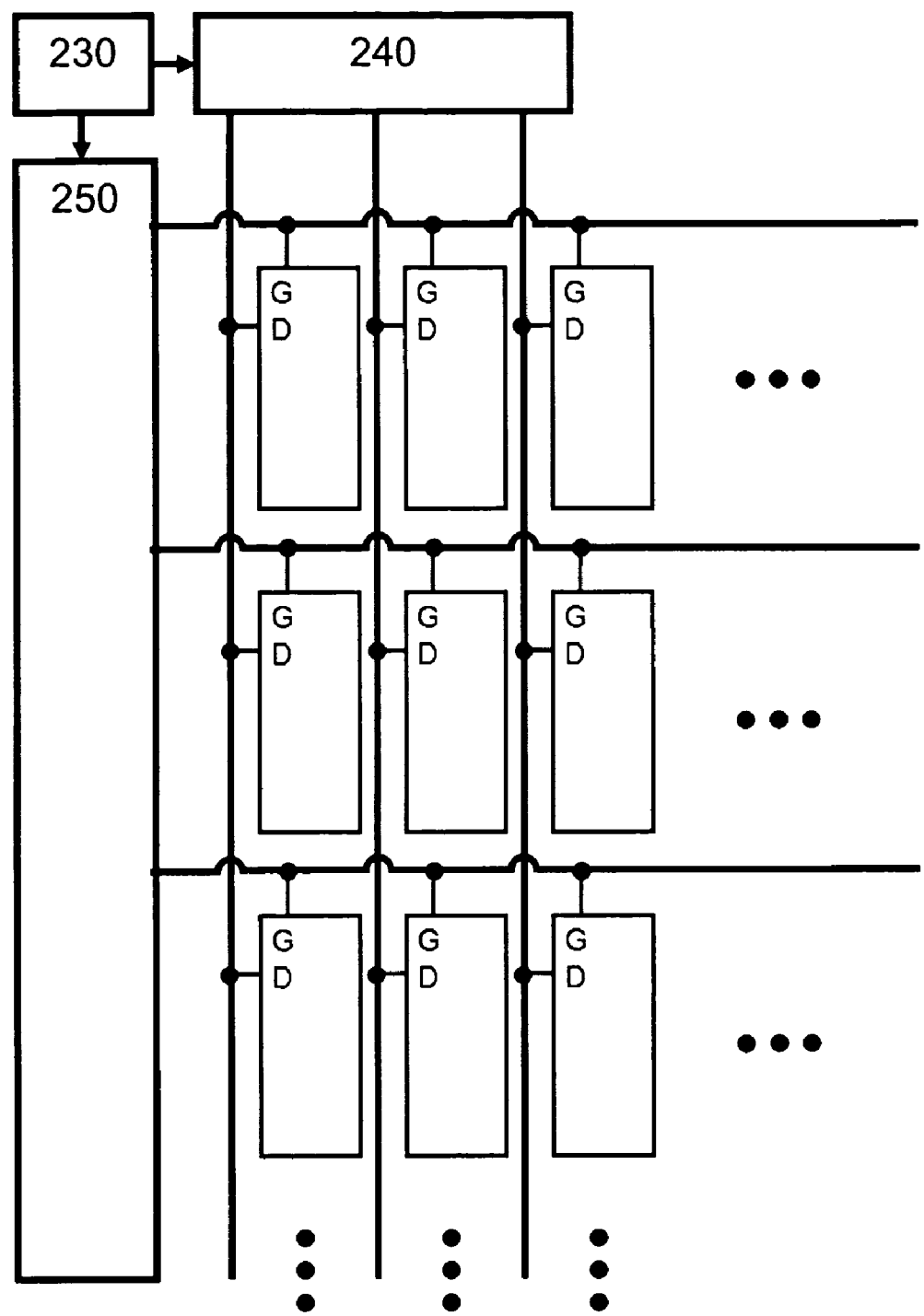
FIG. 2b is a schematic showing the electrode connection between the pixel electronics in FIG. 2a and the driver electronic circuits.
Figure 3:
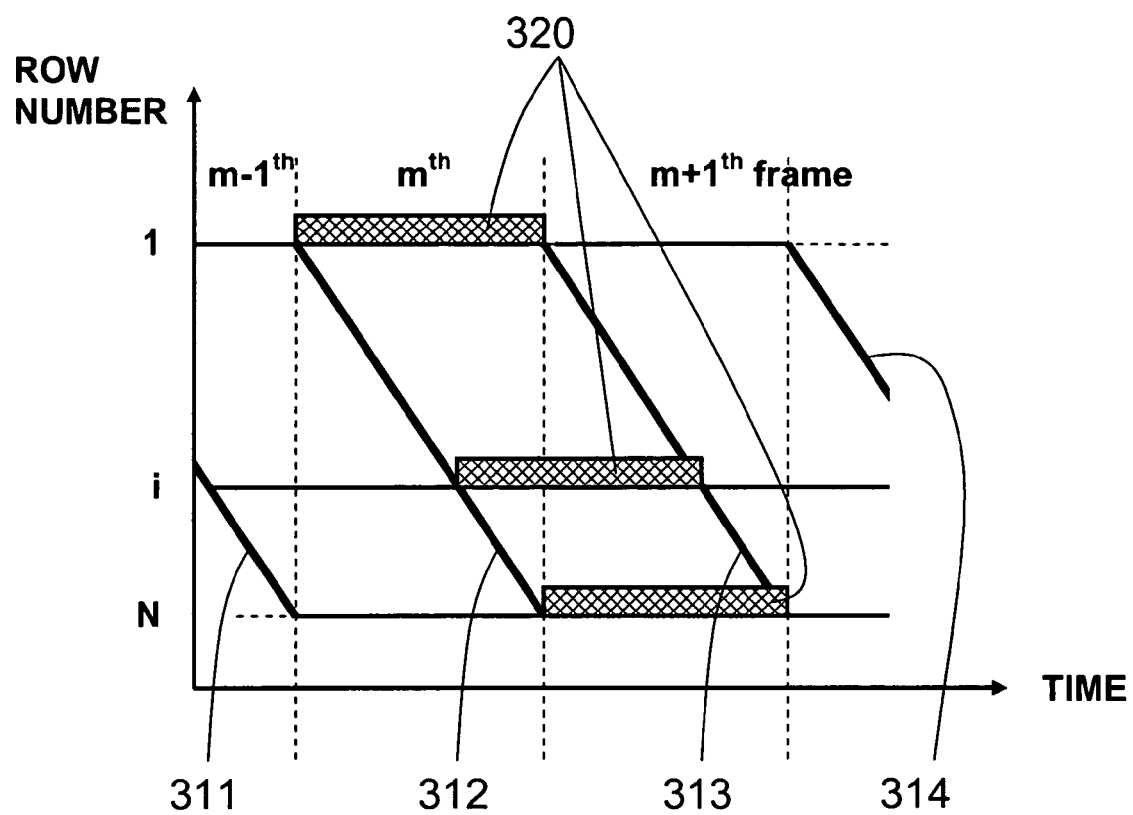
FIG. 3 is a timing diagram of the prior art LCD operation.
Figure 4:
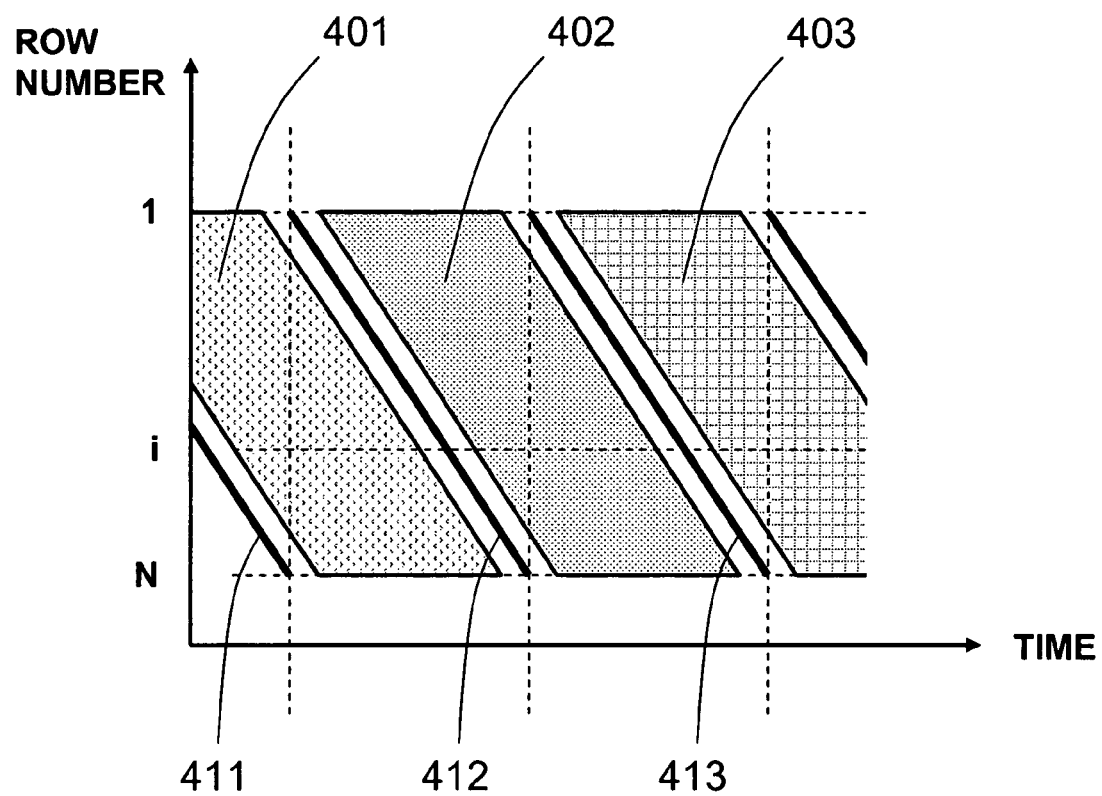
FIG. 4 is a timing diagram of the color sequential LCD under the ideal backlight operation.
Figure 5:
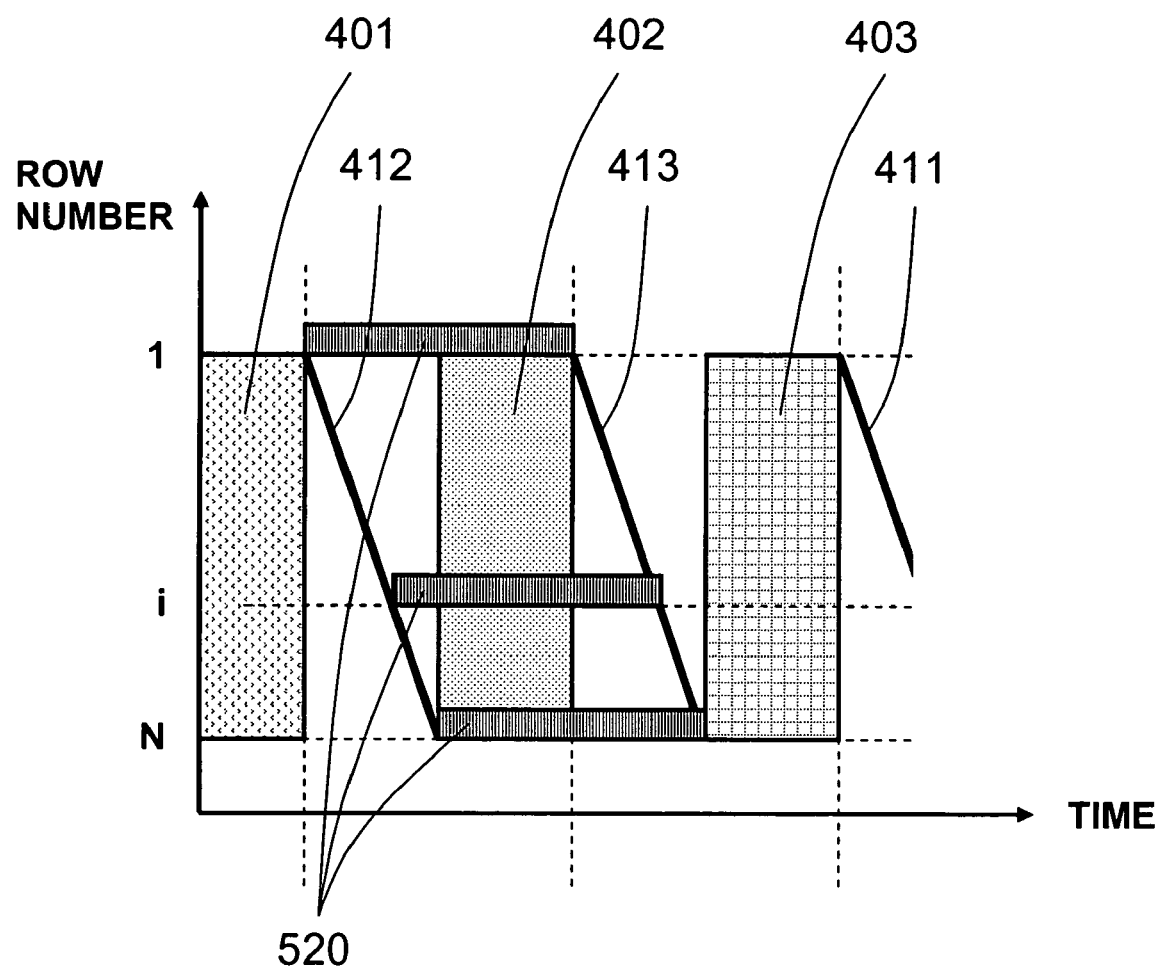
FIG. 5 is a timing diagram showing the color sequential LCD under the pulse type blinking backlight operation.
Figure 6:
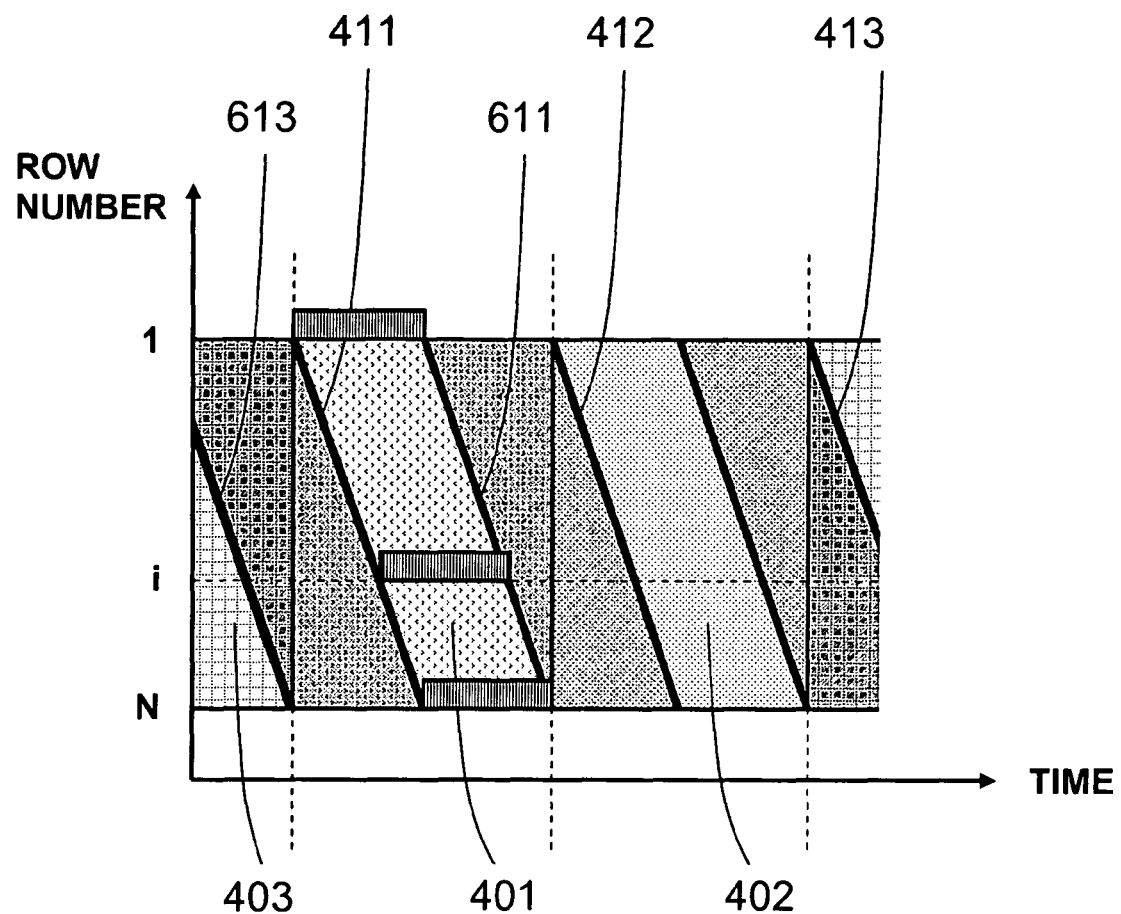
FIG. 6 is a timing diagram showing the color sequential LCD under the blinking type backlight operation using a dark sub-frame between two primary color sub-frames.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the specification to identify components:

| | |
|---|---|
| 100 | prior art pixel structure |
| 101 | red sub-pixel |
| 102 | green sub-pixel |
| 103 | blue sub-pixel |
| 111 | red transmission region |
| 112 | green transmission region |
| 113 | blue transmission region |
| 201 | source terminal |
| 202 | gate terminal |
| 203 | drain terminal |
| 210 | pixel electronic circuit |
| 211 | thin film transistor |
| 212 | capacitor |
| 220 | liquid crystal layer |
| 230 | vertical sync signal |
| 240 | data driver |
| 250 | scan gate driver |
| 311 | first timing line |
| 312 | second timing line |
| 313 | third timing line |
| 314 | fourth timing line |
| 320 | image data |
| 401 | red area |
| 402 | green area |
| 403 | blue area |
| 411 | red timing line |
| 412 | green timing line |
| 413 | blue timing line |
| 520 | image data |
| 611 | next scanning line |
| 613 | timing line |
| 701 | first thin film transistor |
| 702 | second thin film transistor |
| 703 | data line |
| 704 | first gate line |
| 705 | second gate line |
| 706 | TFT drain |
| 707 | first capacitor |
| 708 | memory capacitor |
| 710 | pixel electronic circuit |
| 720 | liquid crystal layer |
| 801 | time one |
| 802 | time two |
| 803 | time three |
| 901 | first reflective sub-pixel |
| 902 | second reflective sub-pixel |
| 903 | third reflective sub-pixel |
| 904 | transmissive sub-pixel |
| 910 | transflective pixel |
| 1011 | first reflective pixel electronics |
| 1012 | second reflective pixel electronics |
| 1013 | third reflective pixel electronics |
| 1022 | transmissive pixel electronic circuit |
| 1101 | pixel |
| 1102 | reflective sub-pixels |
| 1103 | transmissive sub-pixel |
| 1110 | pixel electronic circuit |
| 1120 | timing control unit |
| 1130 | backlight |
| 1140 | reflective data driver |
| 1141 | transmissive image data drivers |
| 1150 | reflective scan driver |
| 1151 | transmissive scan drivers |
| 1210 | reflective timing graph |
| 1211 | timing line |
| 1212 | timing line |
| 1220 | transmissive timing graph |
| 1221 | color sub-frame |
| 1222 | color sub-frame |
| 1223 | color sub-frame |
| 1231 | color sub-frame timing |
| 1232 | color sub-frame timing |
| 1233 | color sub-frame timing |
| 1241 | dark sub-frame timing |
| 1242 | dark sub-frame timing |
| 1243 | dark sub-frame timing |
| 1310 | reflective graph |
| 1311 | reflective scan time |
| 1312 | reflective scan time |
| 1320 | transmissive graph |
| 1321 | color sub-frame |
| 1322 | color sub-frame |
| 1323 | color sub-frame |
| 1331 | transmissive scan time |
| 1332 | transmissive scan time |
| 1333 | transmissive scan time |
| 1401 | pixel |
| 1402 | reflective sub-pixels |
| 1403 | transmissive sub-pixel |
| 1410 | reflective pixel electronic circuit |
| 1411 | transmissive pixel electronic circuit |
| 1420 | timing control unit |
| 1430 | backlight |
| 1440 | reflective data driver |
| 1441 | transmissive image data driver |
| 1450 | reflective scan driver |
| 1451 | transmissive scan driver |
| 1510 | reflective timing graph |
| 1511 | reflective frame scanning |
| 1520 | transmissive timing graph |
| 1531 | first transmissive sub-frame scanning |
| 1604 | time |
| 1610 | reflective timing diagram |
| 1620 | transmissive image timing |
| 1621 | first color sub-frame |
| 1622 | second color sub-frame |
| 1623 | third color sub-frame |
| 1624 | dark sub-frame |
| 1633 | scanning |
| 1701 | pixel |
| 1702 | reflective sub-pixels |
| 1703 | transmissive sub-pixel |
| 1710 | pixel electronic circuit |
| 1720 | timing control unit |
| 1730 | backlight |
| 1740 | first data driver |
| 1741 | second data driver |
| 1750 | first scan driver |
| 1751 | second scan driver |
| 1801 | time |
| 1804 | time |
| 1810 | reflective timing graph |
| 1811 | first reflective frame scan |
| 1812 | reflective mode scan |

-continued

| | |
|---|---|
| 1820 | transmissive timing graph |
| 1831 | first transmissive sub-frame scan |
| 1834 | transmissive mode scan |
| 1842 | time point |

The apparatus, methods, system and devices of the present invention provide a transflective liquid crystal display having a pixel structure including at least three sub-pixels for the reflective part and one sub-pixel for the transmissive part. The sub-pixel for the reflective part has a reflective mirror and a color filter for showing a color image by reflecting an ambient light. To produce a color image in transmissive part of the LC display, a sequentially switched color light from a backlit unit device is used and the transmissive color image is drawn using a series of primary color images. The reflective sub-pixels and the transmissive sub-pixel are independently switched by switching devices such as thin film transistors. As a result of using independent switch devices for the transmissive and reflective parts, the electro-optical performance curves of both transmissive display mode and reflective display mode can overlap with each other very well. The switching devices and related peripheral electronics for both reflective and transmissive sub-pixels are located under the reflectors of the reflective sub-pixels on the bottom substrate. This electronic structure using a single transmissive sub-pixel configuration improves the aperture sizes of both reflective and transmissive sub-pixels compare to prior art. As a result, brighter image for both reflective and transmissive modes is produced.

Figure 9:
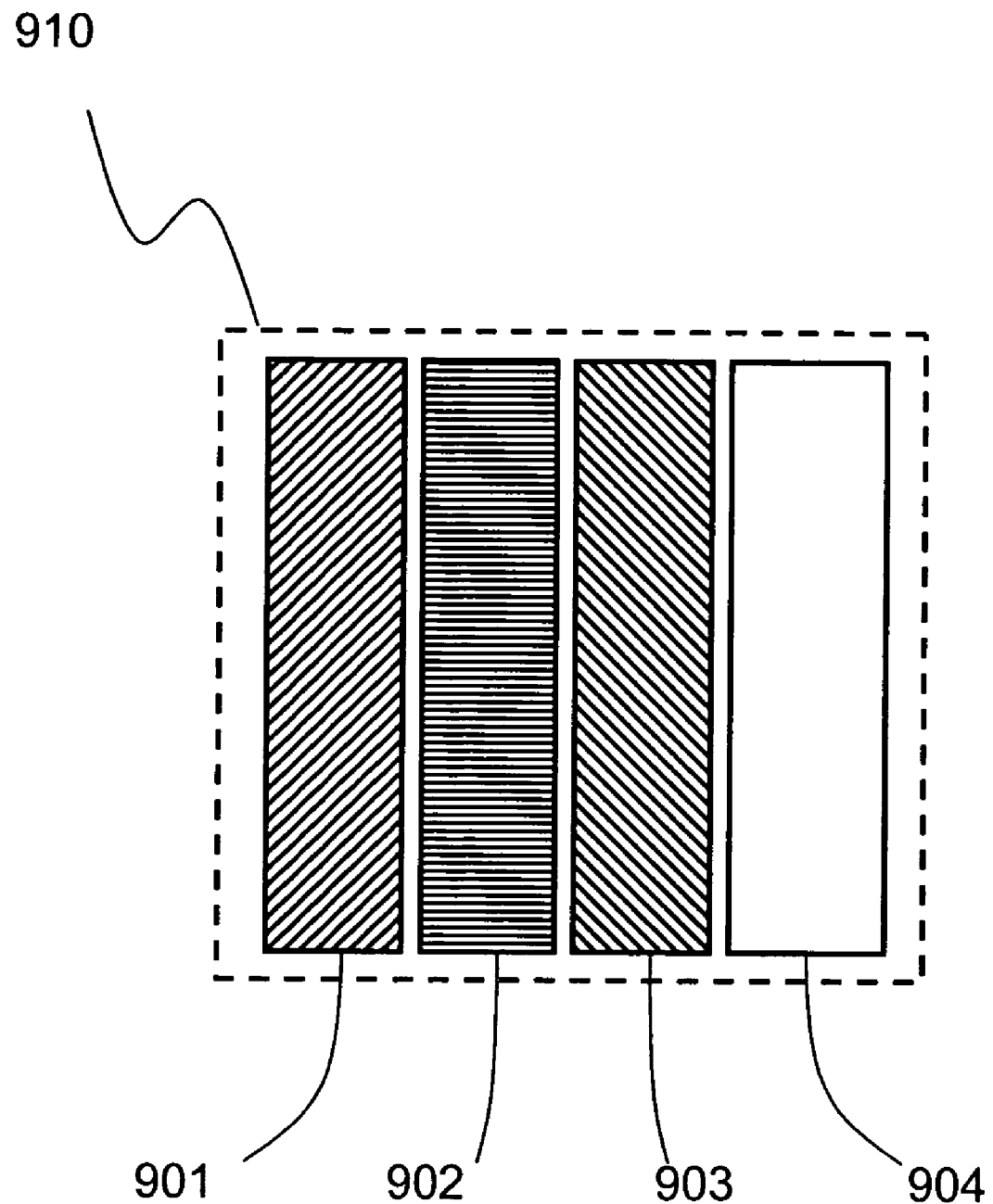
FIG. 9 shows the schematic pixel layout and structure according present invention showing the plural sub-pixels.

FIG. 9 shows a schematic structure and pixel layout of a transflective liquid crystal display of the present invention. As shown, each pixel 910 includes three reflective sub-pixels 901, 902, and 903 for displaying a reflective image and one transmissive sub-pixel 904 for displaying a transmissive image. Each reflective sub-pixel has a reflective mirror located on the inner surface of the bottom substrate to reflect the incident light back to the viewer. To obtain a color image, the reflective mode uses at least three primary color sub-pixels which have color filter layers located either on the bottom substrate or on the top substrate of the LCD. In the present invention, the three sub-pixels 901, 902, and 903 correspond to three primary color sub-pixels which are used to display a color reflective image.

To display a transmissive image, one transmissive sub-pixel 904 is used. This transmissive sub-pixel 904 transmits the light from a backlight source which is behind the LCD panel. To display a full color transmissive image in the transmissive sub-pixel 904, at least three different primary color lights transmit the transmissive sub-pixel 904 sequentially during one frame period, with one primary color light in each sub-frame of the frame period. When the frame frequency is high enough, typically greater than approximately 30 frame/second, the viewer see a full color image. The method for displaying the transmissive color image is referred to as a color sequential imaging method.

Figure 10A:
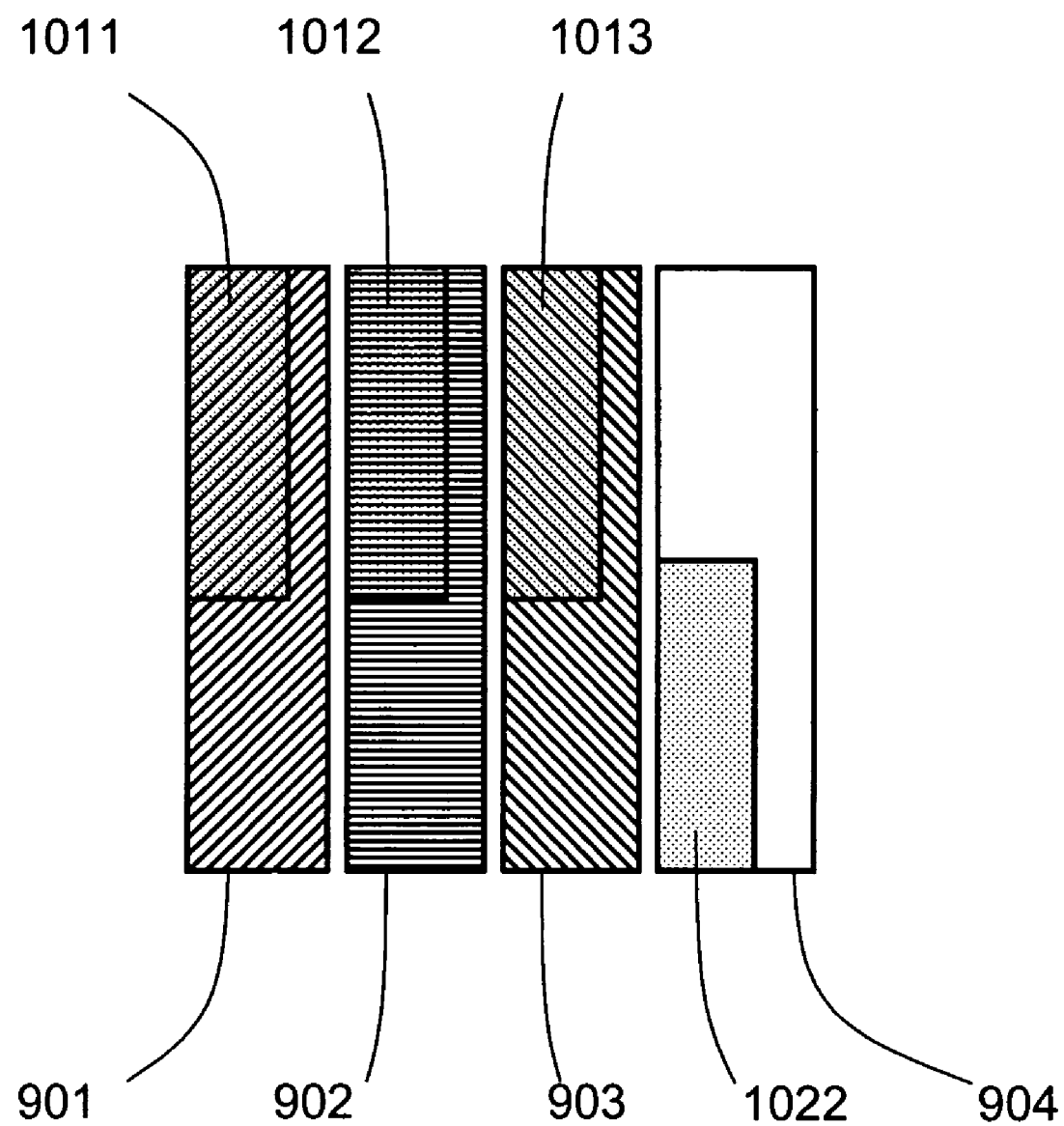
FIG. 10a shows an example of the location of the pixel electronics in the pixel structure of FIG. 9 according to the present invention.

In an embodiment of the present invention, each of those sub-pixels 901, 902, 903, and 904 is driven by an independent electronic switch comprising at least one thin film transistor and at least one capacitor. FIG. 10a shows the location of sub-pixel electronic circuits in the present invention according to the first embodiment. As shown, the first reflective sub-pixel 901 has an electronic circuit 1011, the second reflective sub-pixel 902 is driven by with electronic circuit 1012, the third reflective sub-pixel 903 is driven by electronic circuit 1013, and the transmissive sub-pixel 904 is driven by electronic circuit 1014 as well.

Each sub-pixel's electronic circuit is within the region of the corresponding sub-pixel. In the three reflective sub-pixels, each sub-pixel has an opaque reflective mirror and the electronic circuits are located under the reflective mirror. As a result, the electronic circuits themselves do not affect the aperture ratio of the reflective sub-pixel, yielding a large aperture size and high light utilization efficiency. On the other hand, in the transmissive sub-pixel, the electronic circuits occupy a portion of the sub-pixel area which blocks part of the backlight. As a result, the aperture size is reduced and the brightness of image decreases.

Figure 10B:
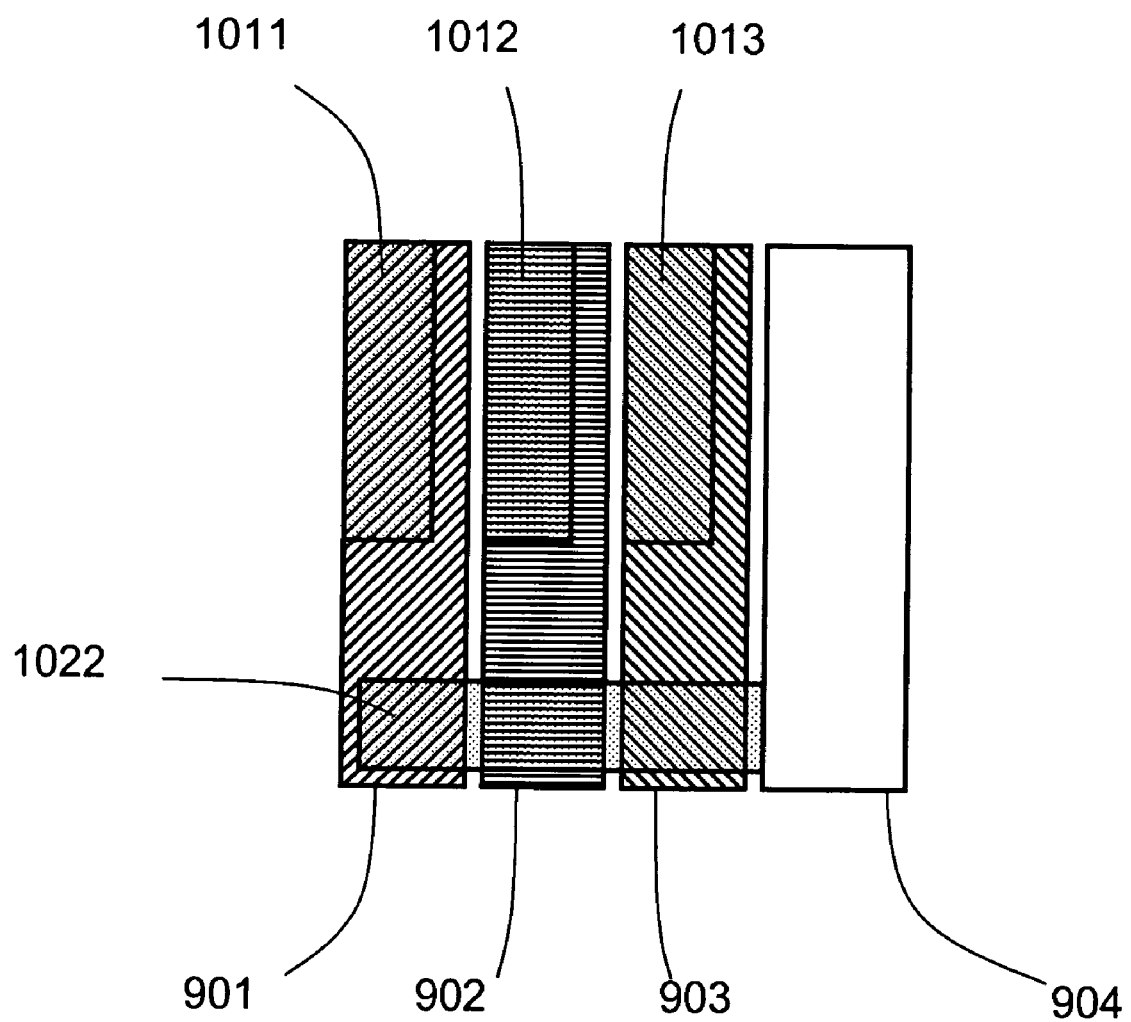
FIG. 10b shows an alternative location of the pixel electronics in the pixel structure shown in FIG. 9 according to the present invention.

FIG. 10B shows the second embodiment of the location of sub-pixel electronic circuits in the present invention. To increase the aperture ratio of the transmissive sub-pixel 904, the sub-pixel electronic circuits 1022 is also located under the reflectors of the reflective sub-pixels 901, 902, and 903. In this embodiment, the aperture ratio of all sub-pixels is maximized. Unlike the prior art transflective LCD's pixel structure shown in FIG. 1, the pixel structure of the present invention shown in FIG. 10b increases the size of all sub-pixels.

In the prior art transflective LCD, each pixel is divided into three different primary color sub-pixels. And the size of each sub-pixel equals to each other. Each sub-pixel has a discontinuous reflector film so that some part of the sub-pixel is transparent and the other part of the sub-pixel is opaque. The transparent part allows the backlight pass through it while the opaque part serves as the reflector to reflect the incident ambient light back to the viewers' eyes. As an example, each one of the three sub-pixels has an area ratio of the transmissive part to the reflective part of approximately 6:4. Therefore, area size of the transmissive part of each sub-pixel occupies approximately 20 percent of one entire pixel size, and the area size of the reflective part of each sub-pixel occupies about 13 percent of one entire pixel size.

In the liquid crystal display of the present invention, one pixel is divided into four equal sized sub-pixels, three reflective sub-pixels and one transmissive sub-pixel. The area size of each sub-pixel is approximately 25 percent of one entire pixel size. In the transflective LCD of the present invention, the area size of the transmissive sub-pixel increases 25 percent while the area size of the reflective sub-pixels increases 92 percent. As a result, the display has brighter image or can have lower power consumption in comparison with the conventional transflective LCDs.

Figure 11:
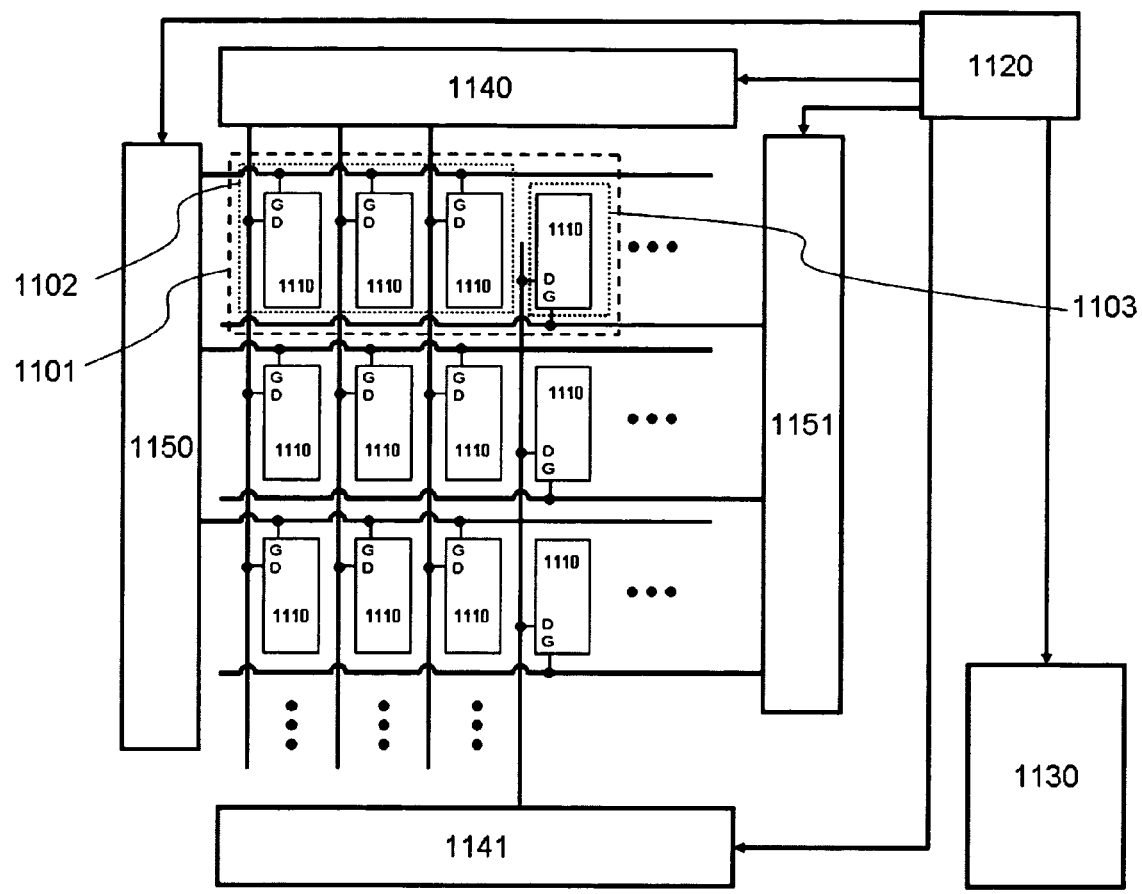
FIG. 11 is a schematic diagram showing yet another alternative electrode connection between the pixel electronics and the driver electronic circuits.

FIG. 11 shows the third embodiment of the present invention based on the pixel structure shown in FIG. 9. In the figure, one pixel 1101 has three reflective sub-pixels 1102 and one transmissive sub-pixel 1103. The reflective sub-pixels 1102 are driven by the scan driver 1150 and the data driver 1140, while the transmissive sub-pixels 1103 is driven by the scan drivers 1151 and the data drivers 1141. In an embodiment of the present invention, both reflective sub-pixels 1102 and transmissive sub-pixels 1103 are driven by a single-switch based electronic circuit 1110. The video data is converted by a timing control unit 1120 and is distributed to the data drivers 1140 and 1141 and scan drivers 1150 and 1151 for the reflective and transmissive sub-pixels, respectively. The timing control unit 1120 also controls the backlight 1130 to synchronize the display of the reflective and transmissive color images.

Figure 12:
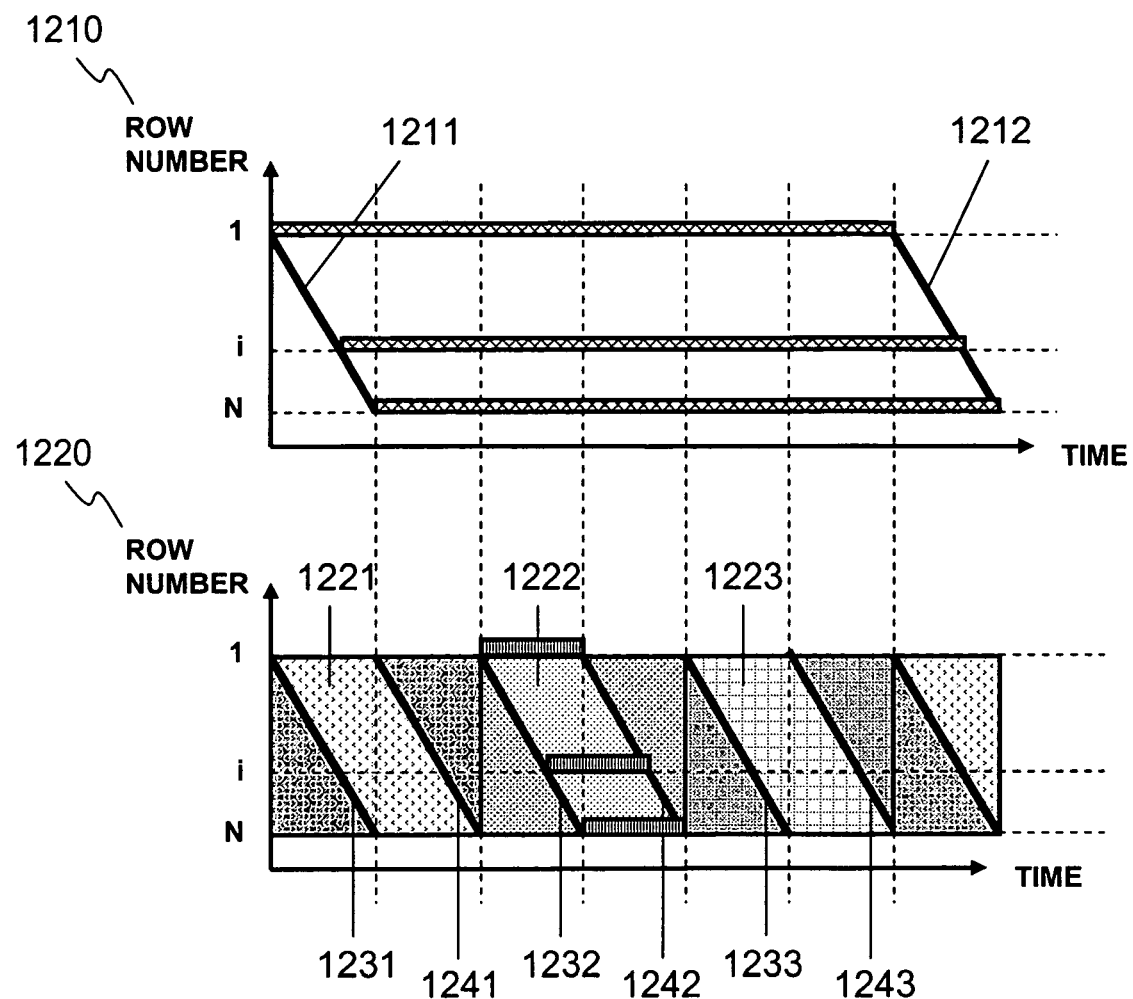
FIG. 12 is a timing diagram showing the operation of the reflective sub-pixels and the transmissive sub-pixel of the transflective LCD shown in FIG. 11.

FIG. 12 shows an example of the operation timing diagram of the transflective LCD shown in FIG. 11. The top graph 1210 is the timing diagram for displaying the reflective image and the bottom graph 1220 shows the timing diagram for displaying the transmissive image. Along timing lines 1211 and 1212, reflective sub-pixels are scanned by the scan driver 1150 and the first and the second frame images are drawn, respectively. During one frame period, the transmissive sub-pixels 904 are scanned six times along the timing lines 1231, 1241, 1232, 1242, 1233, and 1243, during which the three timing lines 1231, 1232, and 1233 are for the three primary color sub-frames 1221, 1222, and 1223 and the three timing lines 1241, 1242, and 1243 are for the three dark sub-frames. During the three timing lines 1231, 1232, and 1233, the transmissive data driver transfers the color image data to the transmissive sub-pixels, while during the three timing lines 1241, 1242, and 1243, the transmissive data driver transfers the dark image data to the transmissive sub-pixels. In other words, the color sub-frame and the dark sub-frame are interleaved within the six sub-frames period. To synchronize the reflective image with transmissive image, the first sub-frame scanning 1231 of the transmissive mode coincides with the frame scanning 1221 of the reflective mode. To produce the color image, the first primary color of the backlight is activated between the time point when the first row of the transmissive sub-pixels are scanned at the first sub-frame scanning and the time point when the first row of the transmissive sub-pixels are scanned at the third sub-frame scanning. As the same manner, the second primary color of the backlight is activated between the time point when the first row of the transmissive sub-pixels are scanned at the third sub-frame scanning and the time point when the first row of the transmissive sub-pixels are scanned at the fifth sub-frame scanning, and the third primary color of the backlight is activated between the time point when the first row of the transmissive sub-pixels are scanned at the fifth sub-frame scanning and the time point when the first row of the transmissive sub-pixels are scanned at the first sub-frame scanning for the next frame. Therefore, the backlight is looked to switch its color on entire lighting area at a moment. To produce the dark image during the second, fourth, and sixth sub-frames of the transmissive sub-pixels, dark image data are transferred from the data driver to the entire transmissive sub-pixels following the second, fourth, and sixth sub-frame scanning.

Figure 13:
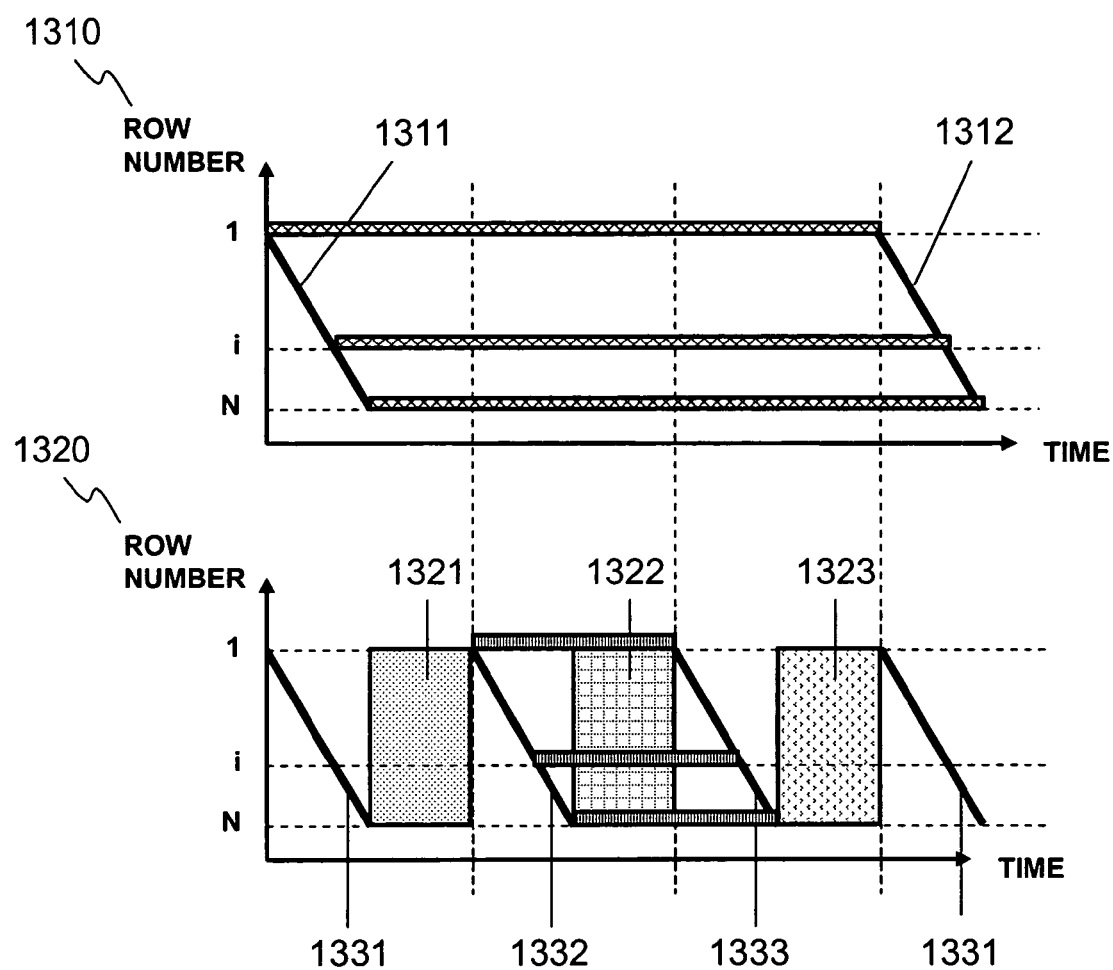
FIG. 13 is a timing diagram showing another example of the operation of the reflective sub-pixels and the transmissive sub-pixel of the transflective LCD shown in FIG. 11.

FIG. 13 shows the second example of the operation timing diagram of the transflective LCD in the third embodiment of the present invention as shown in FIG. 11. The top graph 1310 is the timing diagram for displaying the reflective image and the bottom graph 1320 is for displaying the transmissive image. During the time corresponding to timing lines 1311 and 1312, reflective sub-pixels are scanned by the scan driver 1150 and the first and the second frame images are drawn, respectively. During one frame period, the transmissive sub-pixels 904 are scanned three times along the timing lines 1331, 1332, and 1333. During each scan, after the last row is selected by the scan driver 1150, the primary color backlight is activated between the time point when the last row of the transmissive sub-pixels are scanned for the first sub-frame scanning and the time point when the first row of the transmissive sub-pixels are scanned for the second sub-frame. As a same manner, the second primary color backlight is activated between the time point when the last row of the transmissive sub-pixels are scanned for the second sub-frame scanning and the time point when the first row of the transmissive sub-pixels are scanned for the third sub-frame scanning, and the third primary color backlight is activated between the time point when the last row of the transmissive sub-pixels are scanned for the third sub-frame scanning and the time point when the first row of the transmissive sub-pixels are scanned for the first sub-frame scanning of the next frame imaging. As a result, the corresponding color sub-frame images are shown during the time period of 1321, 1322, and 1323 in the transmissive display mode. In this case, the image of whole area is drawn at a moment although the transmissive image data are transferred to the transmissive sub-pixels row by row.

Figure 7A:
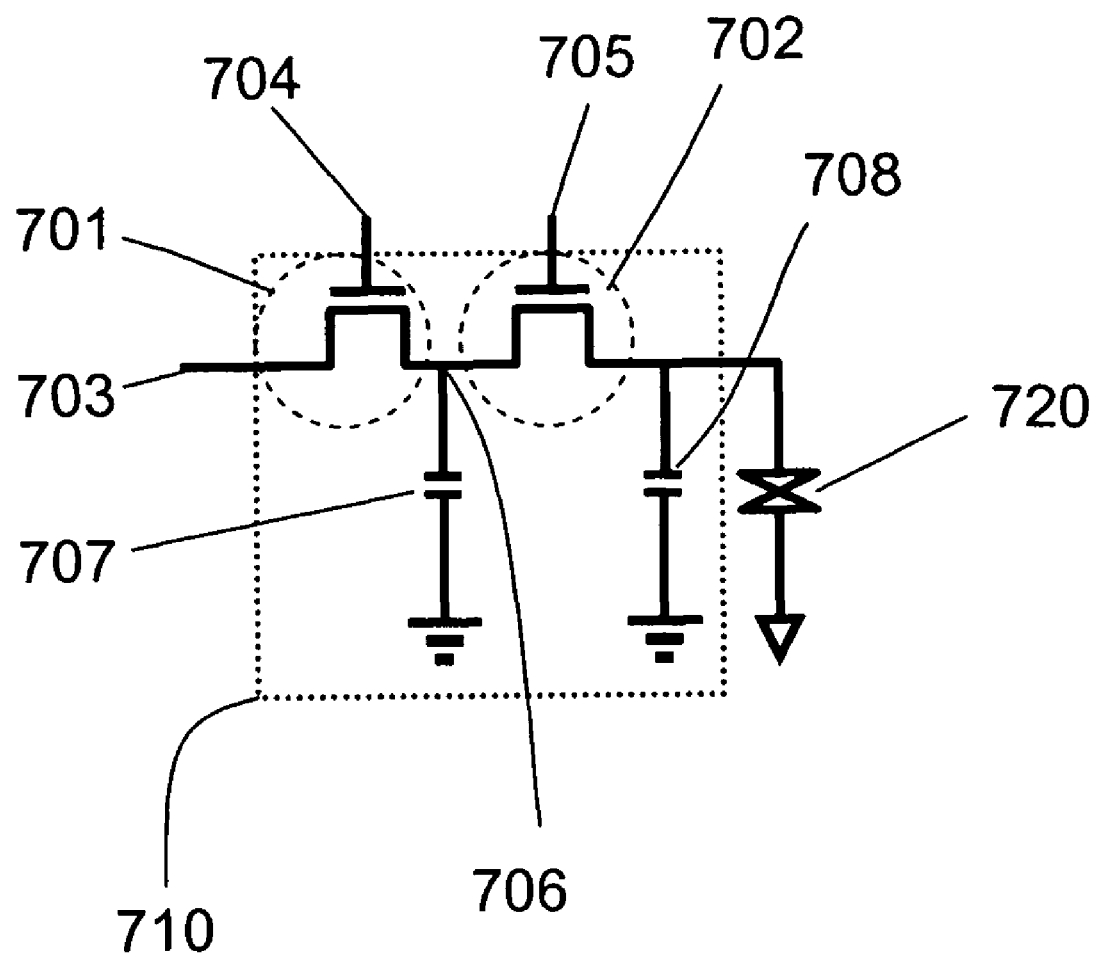
FIG. 7a is a schematic showing the pixel electronics having dual switch devices in each sub-pixel.
Figure 7B:
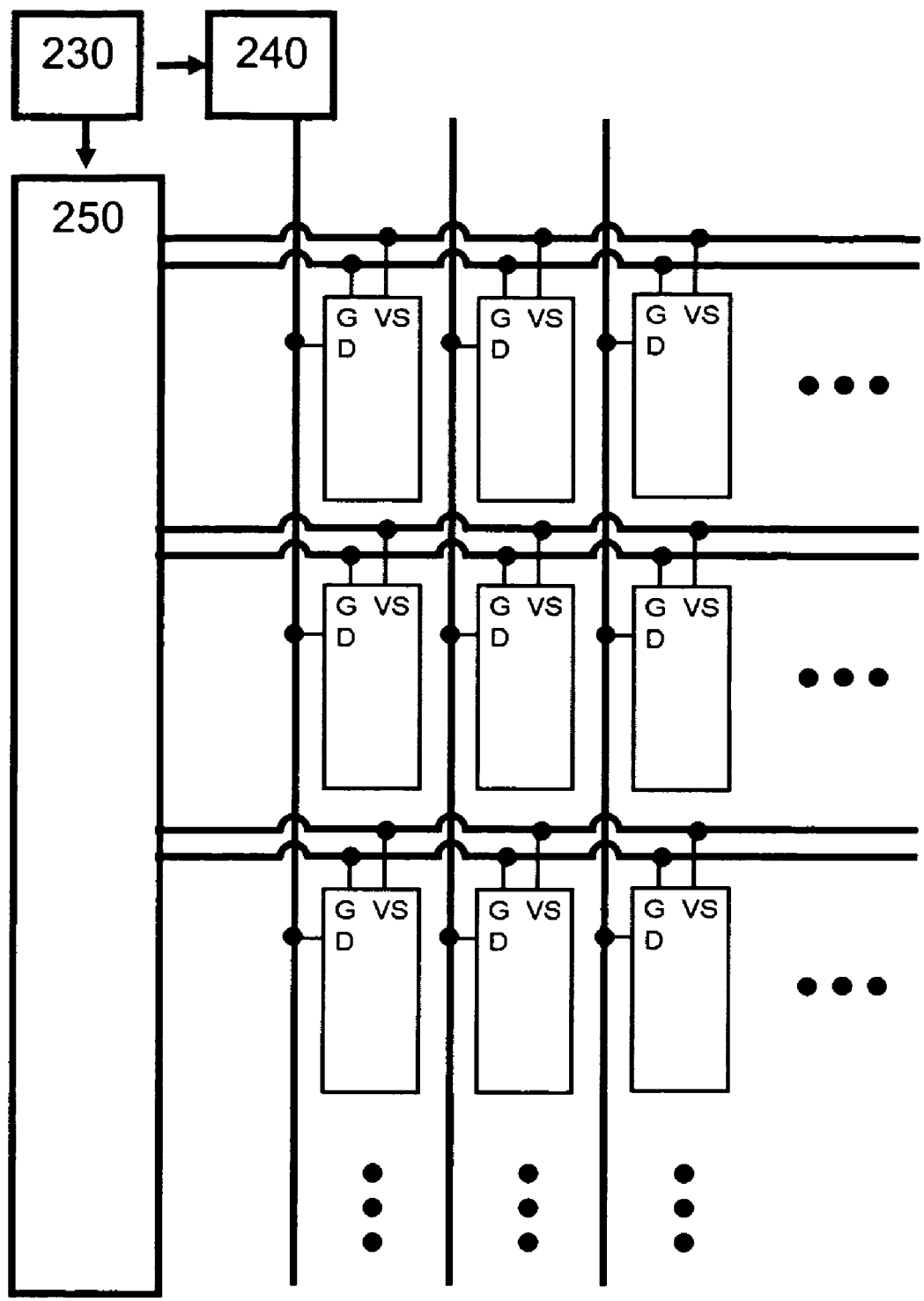
FIG. 7b is a schematic showing the electrode connection between the pixel electronics shown in FIG. 7a and the driver electronic circuits.
Figure 14:
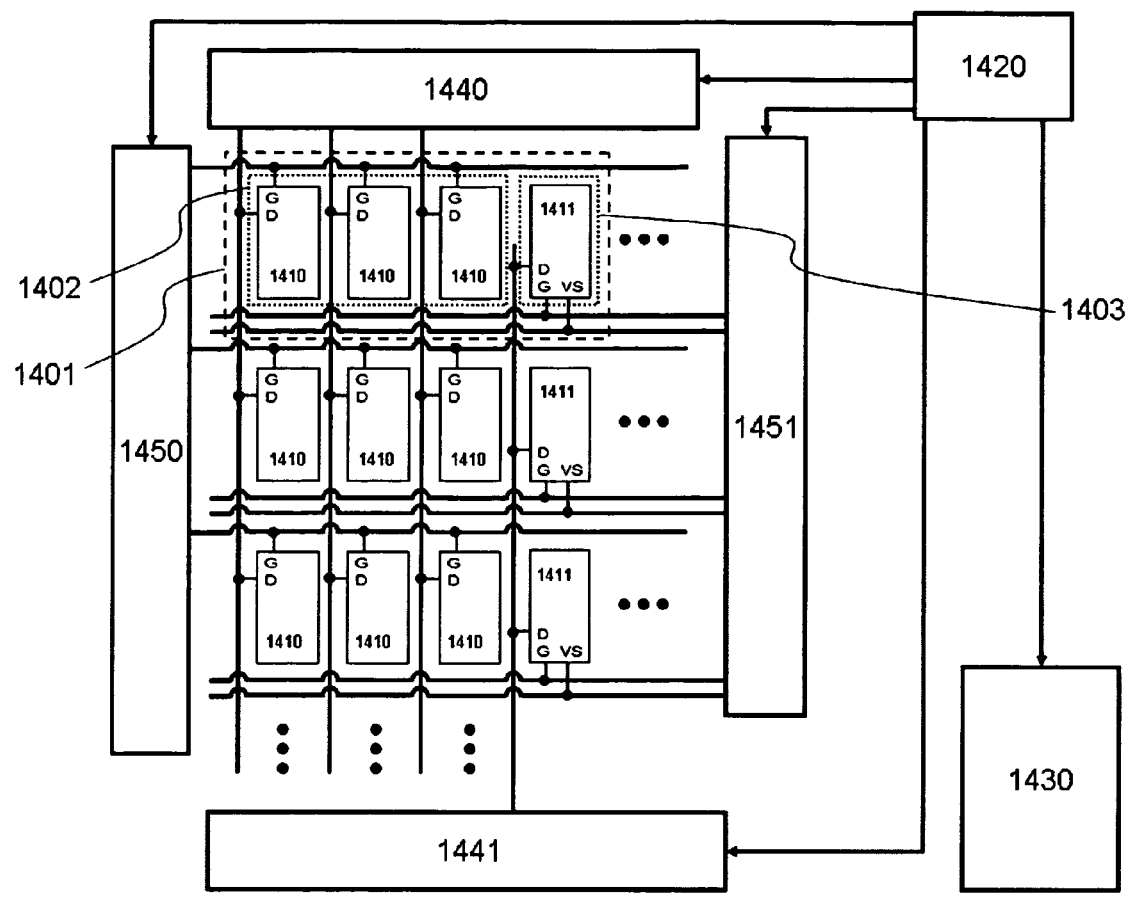
FIG. 14 is a schematic diagram showing an alternative electrode connection between the pixel electronics and the driver electronic circuits.

FIG. 14 shows an alternative configuration of the transflective LCD in the present invention. As previously described, each pixel 1401 comprises three reflective sub-pixels 1402 and one transmissive sub-pixel 1403. However, the reflective sub-pixels 1402 are driven by a single electronic circuit 1410, while the transmissive sub-pixel 1403 is driven by dual-switch based electronic circuits 1411 as explained in the description of the configuration shown in FIG. 7A. The reflective sub-pixels 1402 are connected with the scan driver 1450 and the data driver 1440. The transmissive sub-pixels 1403 are connected with the scan driver 1451 and the data driver 1441. The video data are converted by a timing control unit 1420 and is further distributed to all data drivers 1440 and 1441 and scan drivers 1450 and 1451. Timing control unit 1420 also synchronizes the backlight 1430 operation with the transmissive sub-pixel 1403 operation. In addition, it synchronizes the reflective image displayed by the reflective sub-pixels 1402 with the transmissive image displayed by the transmissive sub-pixels 1403.

Figure 8:
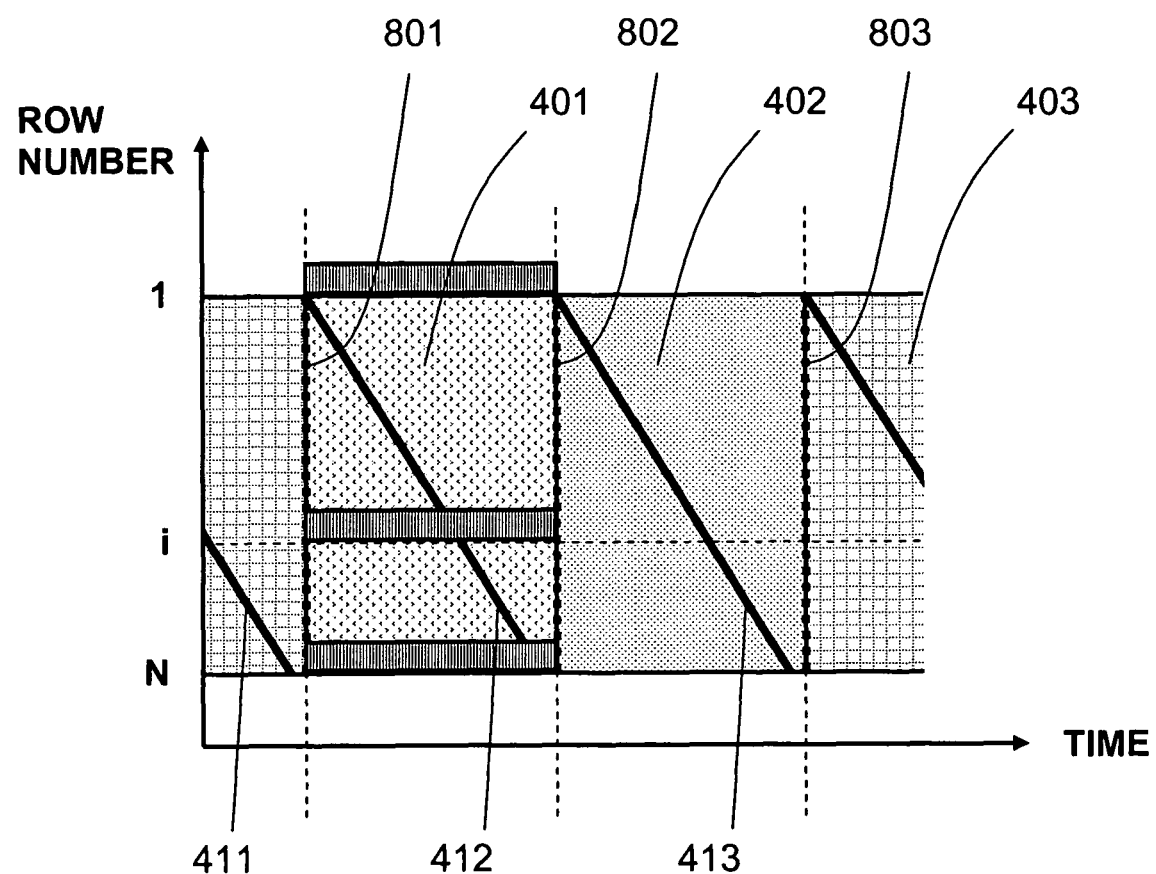
FIG. 8 is a timing diagram of the color sequential LCD with dual switches in each sub-pixel under the blinking type backlight operation.
Figure 15:
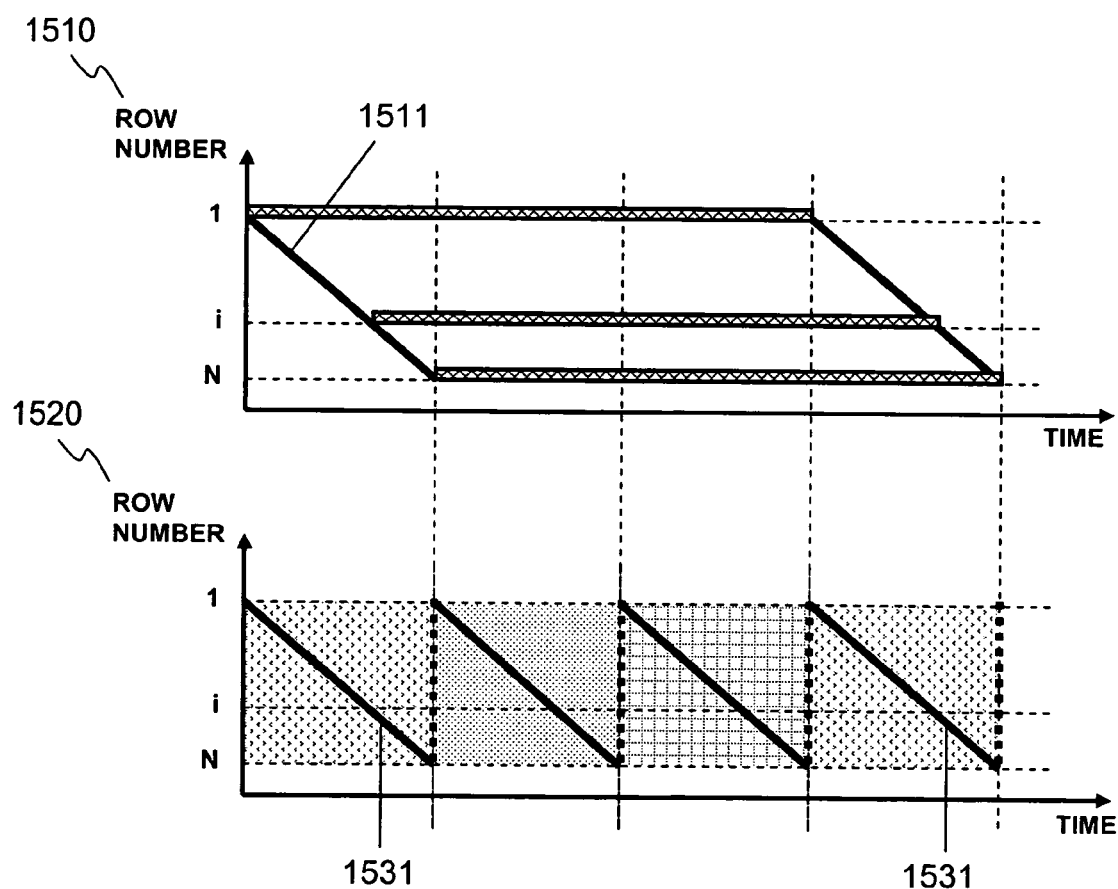
FIG. 15 is a timing diagram showing the operation of the reflective sub-pixels and the transmissive sub-pixel of the transflective LCD shown in FIG. 14.

FIG. 15 shows the first example of the operation timing diagram of the transflective LCD in the fourth embodiment of the present invention as shown in FIG. 14. The top graph 1510 is the timing diagram for displaying the reflective image and the bottom graph 1520 shows the timing diagram for displaying the transmissive image. One frame scanning 1511 of the reflective mode coincides with the first sub-frame scanning 1531 of the transmissive mode. Reflective mode holds the image data for three sub-frame periods of the transmissive mode. The transmissive mode draws the whole area of the image at one time by using the frame buffer method previously described in regard to the configuration shown in FIG. 8. To synchronize the backlight operation with sub-frames of transmissive mode, each primary color is activated during the time period between the time point when the first row of the transmissive sub-pixels are scanned for one sub-frame and the time point when the first row of the transmissive sub-pixels are scanned for the following sub-frame. Because of the difference of imaging method between reflective and transmissive mode, image holding times of the transmissive mode in the first and the third sub-frames are not synchronized with that of the reflective mode.

Figure 16:
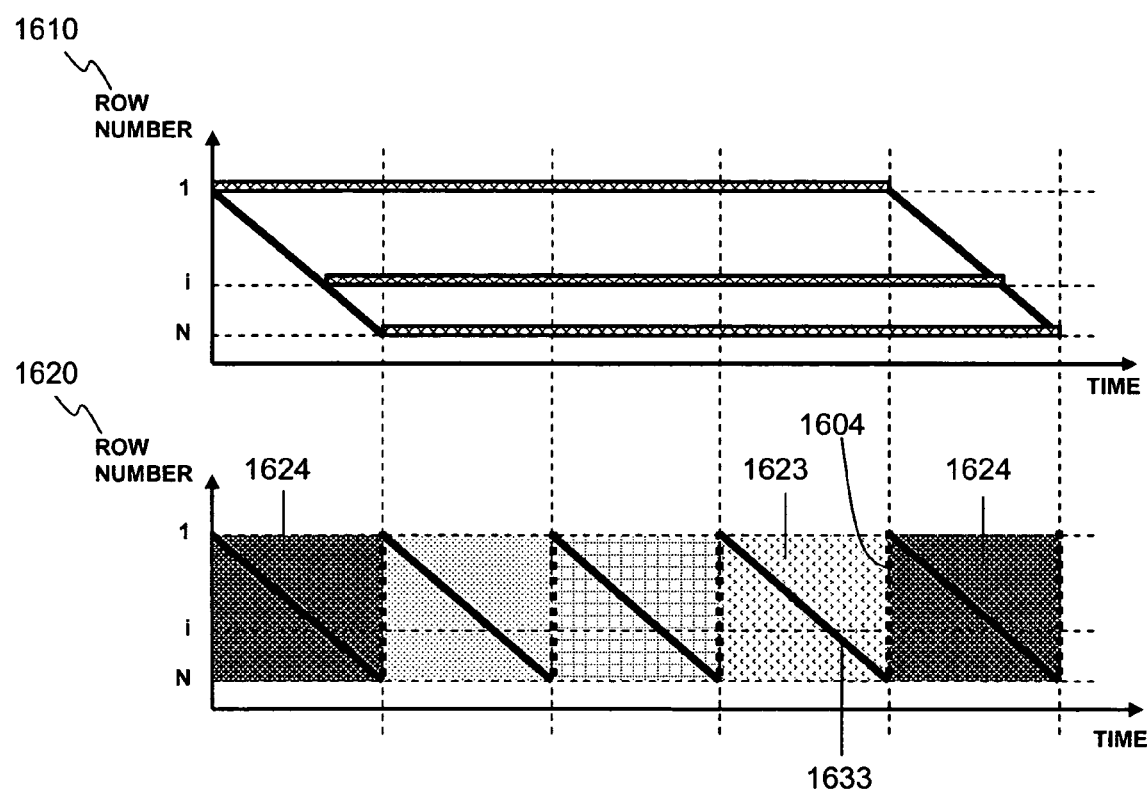
FIG. 16 is a timing diagram showing another example of the operation of the reflective sub-pixels and the transmissive sub-pixel of the transflective LCD shown in FIG. 14

To solve the above problem, FIG. 16 shows another example of the operation timing diagram of the transflective LCD shown in FIG. 14. The top graph 1610 is the timing diagram for displaying the reflective image and the bottom graph 1620 is for displaying the transmissive image. In the transmissive display mode 1620, one dark sub-frame 1624 is introduced after the third sub-frame 1623. The data of the dark sub-frame 1624 are transferred to the frame buffer memory together with the scanning 1633, and further are sent to the imaging part, liquid crystal layer, at the time 1604. In addition, the backlight is turned-off during the dark sub-frame period. Unlike the timing diagram shown in FIG. 15, in this example, the first and last sub-frames in the transmissive mode match with the beginning and end of one frame in the reflective mode.

Figure 17:
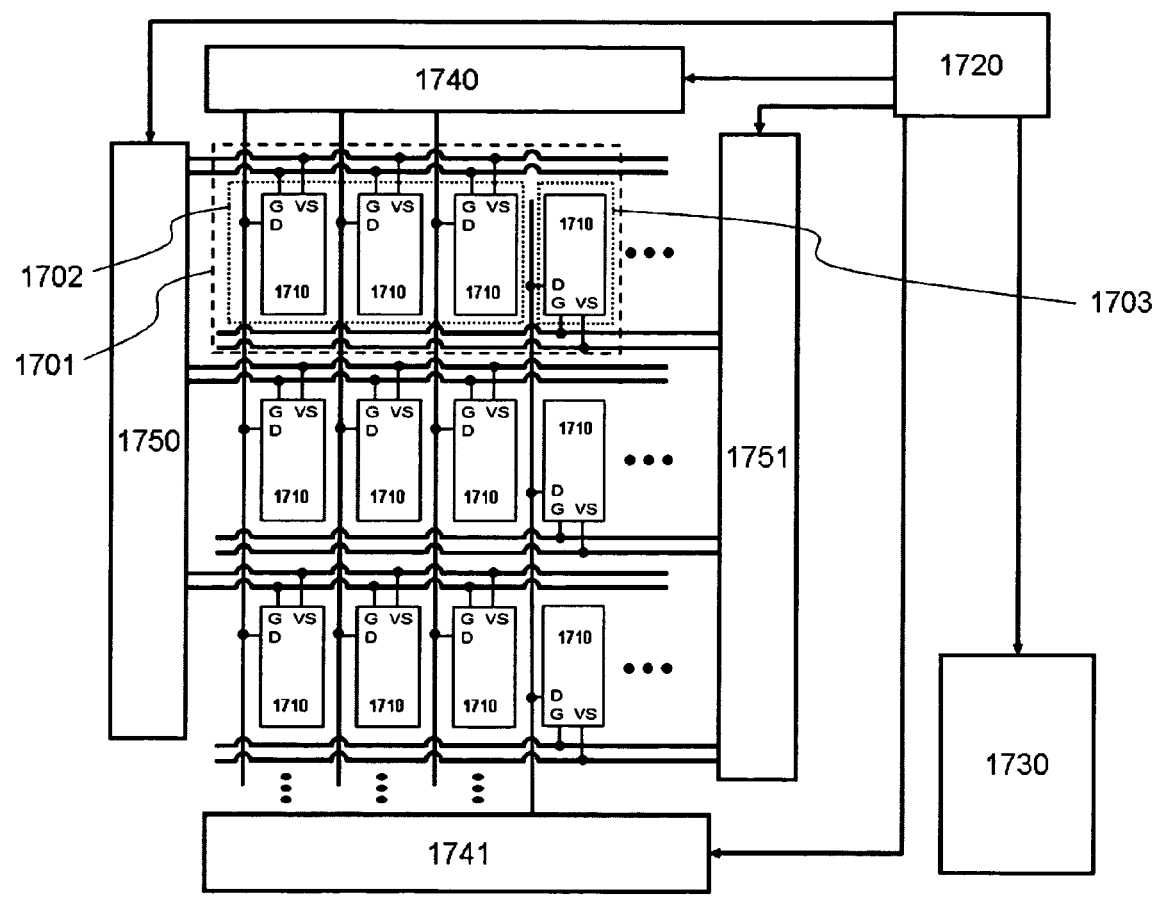
FIG. 17 is a schematic diagram showing an example of the electrode connection between the pixel electronics and the driver electronic circuits.

FIG. 17 is a schematic diagram showing another configuration of the transflective LCD according to the present invention. Like the previous examples, each pixel 1701 comprises three reflective sub-pixels 1702 and one transmissive sub-pixel 1703, however, both reflective sub-pixels 1702 and transmissive sub-pixels 1703 are driven by dual-switch based pixel electronic circuits 1710 as previously described in regard to the configuration shown in FIG. 7A. The reflective sub-pixels 1702 are connected with the scan driver 1750 and the data driver 1740 while the transmissive sub-pixels 1703 are connected with the scan driver 1751 and the data driver 1741. The video data are converted by a timing control unit 1720 and is further distributed to all data drivers 1740 and 1741 and scan drivers 1750 and 1751. Timing control unit 1720 also synchronizes the backlight 1730 operation with the transmissive sub-pixel 1703 operation. In addition, it synchronizes the reflective image displayed by the reflective sub-pixels 1702 with the transmissive image displayed by the transmissive sub-pixels 1703.

Figure 18:
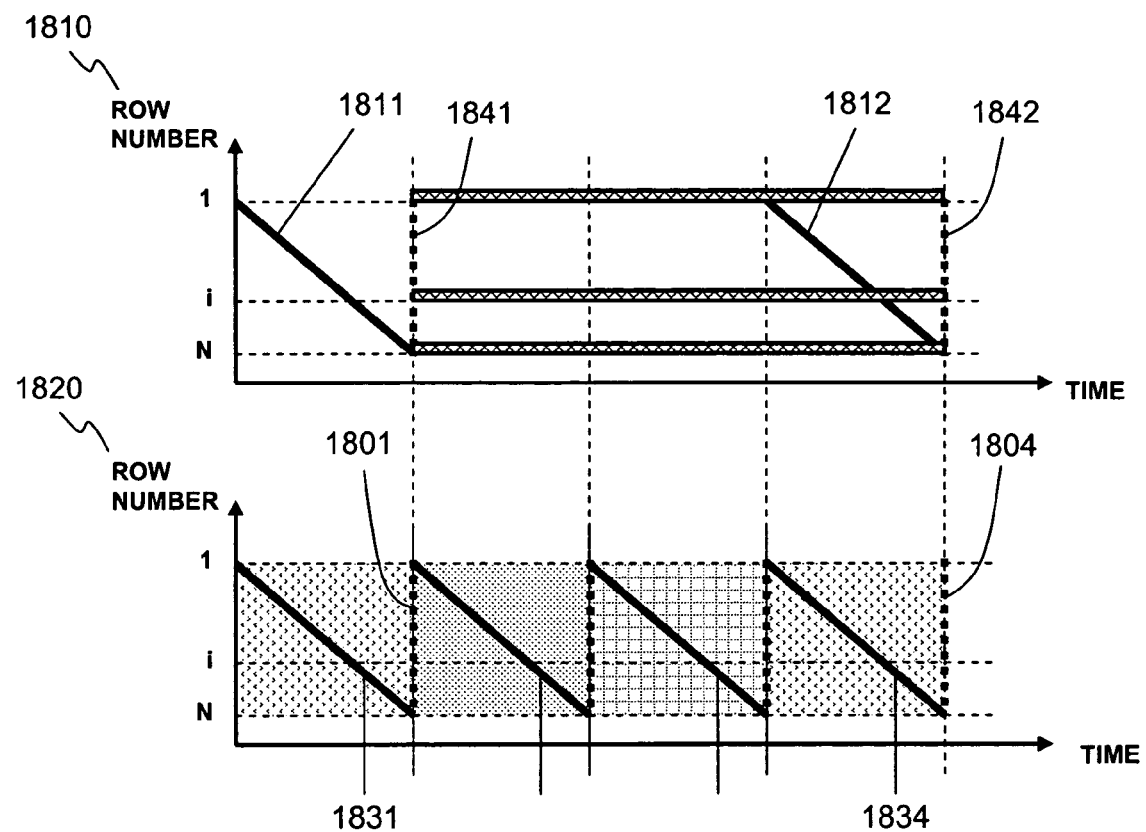
FIG. 18 is a timing diagram showing an example of the operation of the reflective sub-pixels and the transmissive sub-pixel of the transflective LCD shown in FIG. 17.

FIG. 18 shows the operation timing diagram of the transflective LCD configuration shown in FIG. 17. The top graph 1810 is the timing diagram for displaying the reflective image and the bottom graph 1820 is for displaying the transmissive image. By using dual-switch based driving method for both transmissive and reflective modes, it is easy to overlap the transmissive image with the reflective images. The first frame scanning 1811 of the reflective mode coincides with the first sub-frame scanning 1831 of the first frame of transmissive mode. After finishing the first frame scanning 1811 of the reflective mode and the first sub-frame scanning 1831 of the first frame of transmissive mode, data in the frame buffer of transmissive and reflective sub-pixels are transferred to the second capacitor in the sub-pixels at the same time point 1801 and 1841. The reflective image is hold for three sub-frames time of the transmissive mode and the transmissive image of each primary color is hold for one sub-frame time of the transmissive mode.

During the third sub-frame period of the transmissive image, image data for the second frame image of the reflective mode and data for the first sub-frame image of the second fame of the transmissive mode are transferred to the frame buffer memory of both reflective and transmissive sub-pixels along the timing line of reflective mode scanning 1812 and the timing line of transmissive mode scanning 1834. After finishing scanning 1812, data for reflective image in the frame buffer memory are transferred to the second capacitor in the reflective sub-pixels by triggering the second TFT's gate at the time point 1842. As the same manner, data for transmissive image in the frame buffer memory are transferred to the second capacitor in the transmissive sub-pixels at the time point 1804. Timing control unit 1720 synchronizes the time point 1842 with the time point 1804. Due to this timing synchronization, the image frame of the transmissive mode can match perfectly with the image frame of the reflective mode without dark sub-frames used in the fourth embodiment as shown in FIG. 16. To synchronize the backlight operation with sub-frames of transmissive mode, each primary color is activated as the same manner described in FIG. 15.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels, the at least one electronic circuit comprises:
plural first and second scan electrodes;
plural first and second data electrodes, wherein one of the plural first scan electrodes and one of the plural first data electrode connect each one of the at least three reflective sub-pixels to the at least one electronic circuit and one of the plural second scan electrodes and one of the plural second data electrodes connect each one of the transmissive sub-pixel to the at least one electronic circuit; and
at least four pixel electronic circuits connected with the plural first and second scan electrodes and the plural first and second data electrodes for driving the at least three reflective sub-pixel and the transmissive sub-pixel, respectively, for each of the plural pixels, at least three of the pixel electronic circuits are each located in a region of a corresponding one of the at least three reflective sub-pixel and the transmissive sub-pixel, at least three of the at least four pixel electronic circuits are each located below the reflective layer of a corresponding one of the at least three reflective sub-pixels to increase an aperture ratio of the at least three reflective sub-pixel to provide brighter reflective image for the reflective modes;
a backlight below the transmissive sub-pixels; and
a timing control unit connected with the at least one electronic circuit for converting and distributing an incoming video data to the plural pixels and controlling the backlight to synchronize the reflective and transmissive display images.

2. The transflective liquid crystal display of claim 1, wherein each one of the plural pixels further comprises:
at least three different color filter layers located on one of the top and the bottom substrate of the at least three reflective sub-pixels, respectively, wherein the at least three color filter layers display a reflective color image using incoming light from ambient; and
at least three different color light sources below the transmissive sub-pixel to sequentially transmit a color transmissive image for each of the at least three different colors during one time frame.

3. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels, the at least one electronic circuit comprises:
plural first and second scan electrodes;
plural first and second data electrodes, wherein one of the plural first scan electrodes and one of the plural first data electrode connect each one of the at least three reflective sub-pixels to the at least one electronic circuit and one of the plural second scan electrodes and one of the plural second data electrodes connect each one of the transmissive sub-pixel to the at least one electronic circuit; and at least four pixel electronic circuits connected with the plural first and second scan electrodes and the plural first and second data electrodes for driving the at least three reflective sub-pixel and the transmissive sub-pixel, respectively, for each of the plural pixels, wherein the at least four pixel electronic circuits are each located in a region of a corresponding one of the at least three reflective sub-pixel and the transmissive sub-pixel and one of the at least four pixel electronic circuits drives the transmissive sub-pixel and is located below the reflective layer of the at least three reflective sub-pixels to increase an aperture ratio of the transmissive sub-pixel to provide a brighter transmissive image for the transmissive mode;

a backlight below the transmissive sub-pixels; and a timing control unit connected with the at least one electronic circuit for converting and distributing an incoming video data to the plural pixels and controlling the backlight to synchronize the reflective and transmissive display images.

4. A transflective liquid crystal display comprising:

a top and a bottom substrate having a liquid crystal layer sandwiched between the top and the bottom substrate;

plural pixels, each one of the plural pixels comprising:

at least three reflective sub-pixels for displaying a reflective image, wherein each one of the at least three reflective sub-pixels having a reflective layer on an inner surface of the bottom substrate to reflect an incident light back to a viewer; and a transmissive sub-pixel for displaying a transmissive image;

at least one electronic circuit for driving the at least three reflective sub-pixels and the transmissive sub-pixel of each one of the plural pixels, the at least one electronic circuit comprises:

plural first and second scan electrodes;

plural first and second data electrodes, wherein one of the plural first scan electrodes and one of the plural first data electrode connect each one of the at least three reflective sub-pixels to the at least one electronic circuit and one of the plural second scan electrodes and one of the plural second data electrodes connect each one of the transmissive sub-pixel to the at least one electronic circuit;

a reflective pixel electronic circuit connected with the plural first scan and first data electrodes for driving each one of the at least three reflective sub-pixels; and a dual-switch based transmissive pixel electronic circuit connected with the plural second scan and second data electrodes for driving the transmissive sub-pixel;

a backlight below the transmissive sub-pixels; and a timing control unit connected with the at least one electronic circuit for converting and distributing an incoming video data to the plural pixels and controlling the backlight to synchronize the reflective and transmissive display images.

5. The transflective liquid crystal display of claim 4, wherein the dual-switch based transmissive pixel electronic circuit comprises:

a first and a second thin film transistor; and a first and second charge holding device connected with a first and second thin film transistor to connect the plural second scan and second data electrodes to drive the transmissive sub-pixels of the plural pixels, wherein the first thin film transistor and first capacitor functions as a frame memory part and the second thin firm transistor and second capacitor functions as a liquid crystal driver.

6. A transflective liquid crystal display comprising:

a top and a bottom substrate having a liquid crystal layer sandwiched between the top and the bottom substrate;

plural pixels, each one of the plural pixels comprising:

at least three reflective sub-pixels for displaying a reflective image, wherein each one of the at least three reflective sub-pixels having a reflective layer on an inner surface of the bottom substrate to reflect an incident light back to a viewer; and a transmissive sub-pixel for displaying a transmissive image;

at least one electronic circuit for driving the at least three reflective sub-pixels and the transmissive sub-pixel of each one of the plural pixels, wherein the at least one electronic circuit comprises:

plural first and second scan electrodes;

plural first and second data electrodes, wherein one of the plural first scan electrodes and one of the plural first data electrode connect each one of the at least three reflective sub-pixels to the at least one electronic circuit and one of the plural second scan electrodes and one of the plural second data electrodes connect each one of the transmissive sub-pixel to the at least one electronic circuit;

a dual-switch based reflective pixel electronic circuit connected with the plural first scan and first data electrodes for driving each one of the at least three reflective sub-pixels; and a dual-switch based transmissive pixel electronic circuit connected with the plural second scan and second data electrodes for driving the transmissive sub-pixel;

a backlight below the transmissive sub-pixels; and a timing control unit connected with the at least one electronic circuit for converting and distributing an incoming video data to the plural pixels and controlling the backlight to synchronize the reflective and transmissive display images.

7. A transflective liquid crystal display comprising:

a top and a bottom substrate having a liquid crystal layer sandwiched between the top and the bottom substrate;

plural pixels, each one of the plural pixels comprising:

at least three reflective sub-pixels for displaying a reflective image, wherein each one of the at least three reflective sub-pixels having a reflective layer on an inner surface of the bottom substrate to reflect an incident light back to a viewer; and a transmissive sub-pixel for displaying a transmissive image;

at least one electronic circuit for driving the at least three reflective sub-pixels and the transmissive sub-pixel of each one of the plural pixels;

a backlight below the transmissive sub-pixels; and a timing control unit connected with the at least one electronic circuit for converting and distributing an incoming video data to the plural pixels and controlling the backlight to synchronize the reflective and transmissive display images, wherein the timing control unit includes:

a reflective timing signal for scanning the reflective sub-pixels row-by-row once during each one of plural frame periods; and a transmissive timing signal for scanning the transmissive sub-pixels row-by-row for six sub-frames during each one of the plural frame periods, wherein a color sub-frame and a dark sub-frame are interleaved within the six sub-frames.

8. The transflective liquid crystal display of claim 7, wherein the reflective timing signal and the transmissive timing signal further comprises:
a synchronization of the scanning of the reflective and transmissive sub-pixels during the first sub-frame in each frame period.

9. The transflective liquid crystal display of claim 8, further comprising:
a transmissive color signal having six sub-frame periods per time period, wherein a first one of the at least three different color light is activated between a first time point when a first row of transmissive sub-pixels are scanned at a first sub-frame scanning and a second time point when the first row of the transmissive sub-pixels are scanned at a second sub-frame scanning; a second one of the at least three different color light source is activated between the second time point when the first row of the transmissive sub-pixels are scanned during the second sub-frame scanning and a third time point when the first row of the transmissive sub-pixels are scanned during a fifth sub-frame scanning; and a third one of the at least three different color light sources is activated between the third time point when the first row of the transmissive sub-pixels are scanned at a fifth sub-frame scanning and the first time point when the first row of the transmissive sub-pixels are scanned at next first sub-frame scanning of the next frame imaging.

10. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels;
a backlight below the transmissive sub-pixels; and
a timing control unit connected with the at least one electronic circuit for converting and distributing an incoming video data to the plural pixels and controlling the backlight to synchronize the reflective and transmissive display images, wherein the timing control unit further comprises:
a reflective timing signal for scanning the reflective sub-pixels row-by-row once during each one of plural frame periods; and
a transmissive timing signal for scanning the transmissive sub-pixels row-by-row for six sub-frames during each one of the plural frame periods.

11. The transflective liquid crystal display of claim 10, wherein the transmissive timing signal further comprises:
a synchronization of the reflective timing signal with the transmissive timing signal for synchronizing the scanning of the transmissive sub-pixels in a first one of the three sub-frames with the scanning of the first, second and third reflective sub-pixels during the frame time period.

12. The display of claim 11, wherein the scanning period of each sub-frame of the transmissive sub-pixels is less than approximately ⅓ of one frame period.

13. The transflective liquid crystal display of claim 10, further comprising:
a scanning period having a time interval from a beginning time point when the first row of transmissive sub-pixels are scanned through an end time point when the last row transmissive sub-pixels are scanned during one sub-frame period.

14. The transflective liquid crystal display of claim 10, further comprising:
a first one of the at least three different color light sources is activated between a first time point when a last row of the transmissive sub-pixels are scanned for a first sub-frame scanning and a second time point when the first row of the transmissive sub-pixels are scanned for a second sub-frame scanning;
a second one of the at least three different color light sources is activated between the second time point when the last row of the transmissive sub-pixels are scanned for the second sub-frame scanning and a third time point when the first row of the transmissive sub-pixels are scanned for the third sub-frame scanning; and
a third one of the at least three different color light sources is activated between the third time point when the last row of the transmissive sub-pixels are scanned for the third sub-frame scanning and the first time point when the first row of the transmissive sub-pixels are scanned for the first sub-frame scanning of a next frame imaging.

15. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels;
a backlight below the transmissive sub-pixels; and
a timing control unit connected with the at least one electronic circuit for converting and distributing an incoming video data to the plural pixels and controlling the backlight to synchronize the reflective and transmissive display images, wherein the timing control unit further comprises:
a reflective timing signal for scanning the reflective sub-pixels row-by-row once during each one of plural frame periods; and
a transmissive timing signal for scanning the transmissive sub-pixels row-by-row for six sub-frames during each one of the plural frame periods.

16. The transflective liquid crystal display of claim 15, wherein the transmissive timing signal further comprises:
a synchronization of the reflective timing signal with the transmissive timing signal for synchronizing the scanning of the transmissive sub-pixels in a first one of the three sub-frames with the scanning of the first, second and third reflective sub-pixels during the frame time period.

17. The transflective liquid crystal display of claim 16, further comprising:

a transmissive image data are transferred to an image buffer memory in the transmissive pixel electronics during the transmissive sub-frame scanning.

18. The transflective liquid crystal display of claim 17, wherein the transmissive image data in the image buffer are transferred to the second charge holding devices to apply voltage to liquid crystal layer in the transmissive pixel electronics at time point after the last row of the transmissive sub-pixels are scanned for each of sub-frame scanning to draw the image.

19. The transflective liquid crystal display of claim 16, wherein a first one of the at least three different color light is activated between the time point when the last row of the transmissive sub-pixels are scanned for the first sub-frame scanning and the time point when the last row of the transmissive sub-pixels are scanned for the second sub-frame scanning; whererin a second one of the at least three different color light is activated between the time point when the last row of the transmissive sub-pixels are scanned for the second sub-frame scanning and the time point when the last row of the transmissive sub-pixels are scanned for the third sub-frame scanning; and wherein a third one of the at least three different color light is activated between the time point when the last row of the transmissive sub-pixels are scanned for the third sub-frame scanning and the time point when the last row of the transmissive sub-pixels are scanned for the first sub-frame scanning of the next frame imaging.

20. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels;
a backlight below the transmissive sub-pixels; and
a timing control unit connected with the at least one electronic circuit for converting and distributing an incoming video data to the plural pixels and controlling the backlight to synchronize the reflective and transmissive display images, wherein the timing control unit further comprises:
a reflective timing signal for scanning the reflective sub-pixels row-by-row once during each one of plural frame periods; and
a transmissive timing signal for scanning the transmissive sub-pixels row-by-row for six sub-frames during each one of the plural frame periods.

21. The transflective liquid crystal display of claim 20, wherein the transmissive timing signal further comprises:
a synchronization of the reflective timing signal with the transmissive timing signal for synchronizing the scanning of the transmissive sub-pixels in a first one of the three sub-frames with the scanning of the first, second and third reflective sub-pixels during the frame time period.

22. The transflective liquid crystal display of claim 21, further comprising:
a transmissive image data are transferred to an image buffer memory in the transmissive pixel electronics during the transmissive sub-frame scanning.

23. The transflective liquid crystal display of claim 22, wherein the transmissive image data in the image buffer memory are transferred to the second charge holding devices to apply voltage to liquid crystal layer in the transmissive pixel electronics at time point after the last row of the transmissive sub-pixels are scanned for each of sub-frame scanning to draw the transmissive image.

24. The transflective liquid crystal display of claim 20, wherein the transmissive image data transferred during a fourth sub-frame scanning are a dark image data.

25. The transflective liquid crystal display of claim 20, further comprising
a first one of the at least three different color light is activated between the time point when the last row of the transmissive sub-pixels are scanned for the first sub-frame scanning and the time point when the last row of the transmissive sub-pixels are scanned for the second sub-frame scanning;
a second one of the at least three different color light is activated between the time point when the last row of the transmissive sub-pixels are scanned for the second sub-frame scanning and the time point when the last row of the transmissive sub-pixels are scanned for the third sub-frame scanning; and
a third one of the at least three different color light is activated between the time point when the last row of the transmissive sub-pixels are scanned for the third sub-frame scanning and the time point when the last row of the transmissive sub-pixels are scanned for the fourth sub-frame scanning.

26. The transflective liquid crystal display of claim 20, wherein a backlight is deactivated between the time point when the last row of the transmissive sub-pixels are scanned for the fourth sub-frame scanning and the time point when the last row of the transmissive sub-pixels are scanned for the first sub-frame scanning of the next frame imaging.

27. A transflective liquid crystal display comprising:
a top and a bottom substrate having a liquid crystal layer sandwiched between the top and the bottom substrate;
plural pixels, each one of the plural pixels comprising:
at least three reflective sub-pixels for displaying a reflective image, wherein each one of the at least three reflective sub-pixels having a reflective layer on an inner surface of the bottom substrate to reflect an incident light back to a viewer; and
a transmissive sub-pixel for displaying a transmissive image;
at least one electronic circuit for driving the at least three reflective sub-pixels and the transmissive sub-pixel of each one of the plural pixels
a backlight below the transmissive sub-pixels; and
a timing control unit connected with the at least one electronic circuit for converting and distributing an incoming video data to the plural pixels and controlling the backlight to synchronize the reflective and transmissive display images, wherein the timing control unit further comprises:
a reflective timing signal for scanning the reflective sub-pixels row-by-row once during each one of plural frame periods; and
a transmissive timing signal for scanning the transmissive sub-pixels row-by-row for six sub-frames during each one of the plural frame periods.

28. The transflective liquid crystal display of claim 27, wherein the transmissive timing signal further comprises:
a synchronization of the reflective timing signal with the transmissive timing signal for synchronizing the scanning of the transmissive sub-pixels in a first one of the three sub-frames with the scanning of the first, second and third reflective sub-pixels during the frame time period.

29. The display of claim 28, wherein the reflective image data in the frame buffer are transferred to the second charge holding devices to apply voltage to liquid crystal layer in the reflective pixel electronics at time point after the last row of the reflective sub-pixels are scanned for each frame scanning to draw the reflective image.

30. The display of claim 28, wherein the transmissive image data in the frame buffer are transferred to the second charge holding devices to apply voltage to liquid crystal layer in the transmissive pixel electronics at time point after the last row of the transmissive sub-pixels are scanned for each of sub-frame scanning to draw the image.

31. The transflective liquid crystal display of claim 27, further comprising:
   a transmissive image data are transferred to an image buffer memory in the transmissive pixel electronics during the transmissive sub-frame scanning and a reflective image data are transferred to an image buffer memory in the reflective pixel electronics during the reflective frame scanning.

32. The transflective liquid crystal display of claim 27, further comprising:
   a first one of the at least three different color light is activated between the time point when the last row of the transmissive sub-pixels are scanned for the first sub-frame scanning and the time point when the last row of the transmissive sub-pixels are scanned for the second sub-frame scanning;
   a second one of the at least three different color light is activated between the time point when the last row of the transmissive sub-pixels are scanned for the second sub-frame scanning and the time point when the last row of the transmissive sub-pixels are scanned for the third sub-frame scanning; and
   a third one of the at least three different color light is activated between the time point when the last row of the transmissive sub-pixels are scanned for the third sub-frame scanning and the time point when the last row of the transmissive sub-pixels are scanned for the first sub-frame scanning of the next frame imaging.

* * * * *